(12) United States Patent
Bangura et al.

(10) Patent No.: US 10,150,464 B2
(45) Date of Patent: Dec. 11, 2018

(54) DUAL-STRUCTURED ELECTRIC DRIVE AND POWER SYSTEM FOR HYBRID VEHICLES

(71) Applicant: Altigreen Propulsion Labs Private Limited, Bengalura (IN)

(72) Inventors: John F. Bangura, Rockton, IL (US); Lasse Moklegaard, Waverly, IA (US); Amitabh Saran, New Delhi (IN)

(73) Assignee: Altigreen Propulsion Labs Private Limited, Bengaluru (IN)

( * ) Notice: Subject to any disclaimer, the term of this patent is extended or adjusted under 35 U.S.C. 154(b) by 0 days.

(21) Appl. No.: 15/415,762

(22) Filed: Jan. 25, 2017

(65) Prior Publication Data

US 2017/0144649 A1  May 25, 2017

Related U.S. Application Data

(63) Continuation of application No. 13/938,262, filed on Jul. 10, 2013, now Pat. No. 9,580,065.
(Continued)

(51) Int. Cl.
*B60W 20/13* (2016.01)
*B60W 10/08* (2006.01)
(Continued)

(52) U.S. Cl.
CPC ............... *B60W 20/13* (2016.01); *B60K 1/02* (2013.01); *B60K 6/26* (2013.01); *B60K 6/365* (2013.01);
(Continued)

(58) Field of Classification Search
CPC .... B60W 10/08; B60W 10/115; B60W 20/13; B60K 6/365; B60K 6/26; B60K 6/44; F16H 37/065; B60Y 2300/66; Y10S 903/906
See application file for complete search history.

(56) References Cited

U.S. PATENT DOCUMENTS

| 4,476,395 A | 10/1984 | Cronin |
| 4,572,961 A | 2/1986 | Borger |

(Continued)

FOREIGN PATENT DOCUMENTS

WO   2011106944   9/2011

*Primary Examiner* — Jacob S. Scott
*Assistant Examiner* — Tinh Dang
(74) *Attorney, Agent, or Firm* — Schwabe, Williamson & Wyatt P.C.

(57) ABSTRACT

Disclosed in the present invention is a dual-structured power output apparatus of an electric drive and power system that provides a means for outputting both mechanical power and electrical power. It comprises dual motor/generators having two stator assemblies, two rotor assemblies and a power transmission unit all integrated into a single housing for easy mounting. The power transmission unit is disposed adjacent to the two motor/generators and coupled on both ends to rotating shafts mechanically linked to the rotor assemblies such that they are rotatable relative to each other. It function is to change the rotational speed and torque of at least one of the rotors in order to reduce weight and physical size of the apparatus, and thus significantly improving the power density and capability. The structure of the apparatus is well-suited to improve the performance and fuel efficiency of the prior art hybrid powertrain.

21 Claims, 7 Drawing Sheets

Related U.S. Application Data

(60) Provisional application No. 61/741,763, filed on Jul. 17, 2012.

(51) Int. Cl.

| | | |
|---|---|---|
| *B60K 6/365* | (2007.10) | |
| *F16H 37/06* | (2006.01) | |
| *B60K 6/44* | (2007.10) | |
| *B60W 20/40* | (2016.01) | |
| *B60K 6/445* | (2007.10) | |
| *F16H 37/08* | (2006.01) | |
| *H02K 16/00* | (2006.01) | |
| *B60L 11/12* | (2006.01) | |
| *B60L 11/14* | (2006.01) | |
| *B60L 11/18* | (2006.01) | |
| *B60L 15/20* | (2006.01) | |
| *B60L 7/14* | (2006.01) | |
| *B60K 6/26* | (2007.10) | |
| *B60W 10/115* | (2012.01) | |
| *B60K 1/02* | (2006.01) | |
| *H02K 7/116* | (2006.01) | |

(52) U.S. Cl.
CPC .............. *B60K 6/445* (2013.01); *B60L 7/14* (2013.01); *B60L 11/123* (2013.01); *B60L 11/14* (2013.01); *B60L 11/1861* (2013.01); *B60L 15/2009* (2013.01); *B60L 15/2054* (2013.01); *B60W 10/08* (2013.01); *B60W 10/115* (2013.01); *B60W 20/40* (2013.01); *F16H 37/065* (2013.01); *F16H 37/0826* (2013.01); *H02K 16/00* (2013.01); *B60K 6/44* (2013.01); *B60L 2210/40* (2013.01); *B60L 2220/50* (2013.01); *B60L 2240/12* (2013.01); *B60L 2240/421* (2013.01); *B60L 2240/423* (2013.01); *B60L 2240/425* (2013.01); *B60L 2240/427* (2013.01); *B60L 2240/429* (2013.01); *B60L 2240/441* (2013.01); *B60L 2240/443* (2013.01); *B60L 2240/486* (2013.01); *B60L 2250/26* (2013.01); *B60Y 2300/66* (2013.01); *H02K 7/116* (2013.01); *Y02T 10/6217* (2013.01); *Y02T 10/641* (2013.01); *Y02T 10/645* (2013.01); *Y02T 10/705* (2013.01); *Y02T 10/7005* (2013.01); *Y02T 10/7044* (2013.01); *Y02T 10/7077* (2013.01); *Y02T 10/7241* (2013.01); *Y02T 10/7275* (2013.01); *Y10S 903/906* (2013.01); *Y10S 903/944* (2013.01); *Y10T 477/23* (2015.01)

(56) References Cited

U.S. PATENT DOCUMENTS

| | | | |
|---|---|---|---|
| 4,663,581 A | | 5/1987 | Glennon |
| 4,691,119 A | | 9/1987 | McCabria |
| 4,729,258 A | * | 3/1988 | Mohri ................ F16H 3/72 475/1 |
| 4,879,484 A | | 11/1989 | Huss |
| 5,300,848 A | | 4/1994 | Huss |
| 5,334,116 A | * | 8/1994 | Baxter, Jr. ........... B60K 17/344 180/248 |
| 5,382,858 A | | 1/1995 | Sugiyama |
| 5,396,968 A | * | 3/1995 | Hasebe ................ B60K 1/02 180/233 |
| 5,801,497 A | * | 9/1998 | Shamoto ............ B60K 6/445 180/65.235 |
| 5,844,342 A | * | 12/1998 | Miyatani ............ B60K 6/448 310/112 |
| 5,845,731 A | * | 12/1998 | Buglione ............ B60K 6/26 180/65.23 |
| 5,914,575 A | * | 6/1999 | Sasaki ............ B60W 10/18 180/65.235 |
| 5,934,395 A | * | 8/1999 | Koide ............ B60W 20/15 180/65.235 |
| 5,943,918 A | | 8/1999 | Reed |
| 5,967,940 A | | 10/1999 | Yamaguchi |
| 5,993,169 A | * | 11/1999 | Adachi ............ B60K 6/26 417/223 |
| 6,155,364 A | * | 12/2000 | Nagano ............ B60K 6/26 180/65.235 |
| 6,166,499 A | * | 12/2000 | Kanamori ............ B60K 6/26 180/65.24 |
| 6,278,195 B1 | | 8/2001 | Yamaguchi |
| 6,281,660 B1 | | 8/2001 | Abe |
| 6,462,430 B1 | | 10/2002 | Joong |
| 6,476,571 B1 | * | 11/2002 | Sasaki ............ B60K 6/26 180/65.1 |
| 6,700,268 B2 | | 3/2004 | Joong |
| 7,389,837 B2 | | 6/2008 | Tamai |
| 7,404,460 B2 | | 7/2008 | Oshidari |
| 7,686,726 B2 | * | 3/2010 | Thompson ............ B62D 11/02 475/150 |
| 7,753,147 B2 | | 7/2010 | Usoro |
| 7,914,416 B2 | | 3/2011 | Maguire |
| 8,225,608 B2 | | 7/2012 | Wu |
| 8,360,181 B2 | | 1/2013 | Wei |
| 8,412,396 B2 | | 4/2013 | Swales |
| 8,475,311 B2 | | 7/2013 | Ren |
| 8,517,880 B2 | | 8/2013 | Hoshino |
| 8,798,837 B2 | | 8/2014 | Kanayama |
| 9,441,599 B2 | | 9/2016 | Bangura |
| 9,580,065 B2 | | 2/2017 | Bangura |
| 9,647,582 B2 | | 5/2017 | Bangura |
| 2004/0040810 A1 | | 3/2004 | Notsu |
| 2004/0146419 A1 | | 7/2004 | Kawaguchi |
| 2005/0107198 A1 | | 5/2005 | Sowul |
| 2005/0187066 A1 | | 8/2005 | Moses et al. |
| 2006/0019786 A1 | | 1/2006 | Asa |
| 2006/0263203 A1 | | 11/2006 | Barker |
| 2007/0049455 A1 | | 3/2007 | Kuramochi |
| 2008/0027592 A1 | | 9/2008 | Steffen |
| 2009/0001843 A1 | | 1/2009 | Emomoto |
| 2009/0082151 A1 | * | 3/2009 | Tabata ............ B60K 6/26 475/5 |
| 2009/0250278 A1 | * | 10/2009 | Kawasaki ............ B60K 1/02 180/65.275 |
| 2010/0025128 A1 | * | 2/2010 | Abe ............ B60K 6/26 180/65.25 |
| 2010/0076663 A1 | | 3/2010 | Jinno et al. |
| 2011/0040432 A1 | | 2/2011 | Kaltenbach |
| 2011/0160019 A1 | | 6/2011 | Harada |
| 2012/0065015 A1 | | 3/2012 | Tamai |
| 2012/0277059 A1 | | 11/2012 | Akutsu |
| 2013/0005529 A1 | | 1/2013 | Chen |
| 2013/0066529 A1 | * | 3/2013 | Murayama ............ F16H 61/12 701/62 |
| 2013/0131941 A1 | * | 5/2013 | Kitahata ............ B60K 6/38 701/58 |
| 2013/0225362 A1 | * | 8/2013 | Sato ............ B60K 6/445 477/3 |
| 2013/0297133 A1 | * | 11/2013 | Hasegawa ............ B60K 6/445 701/22 |
| 2014/0007740 A1 | * | 1/2014 | Takahashi ............ B60K 6/445 74/665 A |
| 2014/0024490 A1 | | 1/2014 | Bangura |
| 2014/0045648 A1 | | 2/2014 | Bangura |
| 2014/0129067 A1 | * | 5/2014 | Furukawa ............ B60K 6/442 701/22 |
| 2014/0277892 A1 | * | 9/2014 | Harada ............ B60K 6/445 701/22 |
| 2015/0360555 A1 | | 12/2015 | Piazza et al. |
| 2015/0360556 A1 | | 12/2015 | Piazza et al. |
| 2016/0329842 A1 | | 11/2016 | Bangura |
| 2017/0291483 A1 | | 10/2017 | Bangura |

\* cited by examiner

DUAL-STRUCTURED ELECTRIC DRIVE AND POWER SYSTEM FOR HYBRID VEHICLES

CROSS-REFERENCE TO RELATED APPLICATIONS

This application is a continuation of and claims priority benefit to U.S. Ser. No. 13/938,262, filed Jul. 10, 2013, which is a non-provisional of and claims priority to U.S. Provisional Application No. 61/741,763, filed on Jul. 17, 2012, all of which are incorporated herein by reference in their entirety for all purposes.

BACKGROUND OF THE INVENTION

The present invention pertains to power-assist parallel hybrid vehicles. More specifically, the present invention pertains to a dual-structured power output apparatus that provides a means for outputting both mechanical power and electrical power with high efficiency and is capable of improving fuel efficiency of the prior art hybrid vehicle, as well as to an electric drive and power system and a method of controlling the power output apparatus.

In recent years, the trend in the development of fuel-efficient and low emission hybrid vehicle powertrain technologies that combine a conventional combustion engine (ICE) with an electric propulsion system has increased significantly. Among the roughly four main categories: series, parallel, series-parallel and mild hybrid vehicle technologies on the market today, the mild hybrid technology is the least expensive and affordable. The technology is relatively less complex and can be readily retrofitted into an existing conventional vehicle with little or no modifications. It involves replacing the conventional alternator with an over-sized belt-driven electric motor that is commonly referred to as a Belt Alternator Starter (BAS). The motor is coupled to the engine via a serpentine belt so that it serves as both a generator and starter. This permits a low-cost method of adding hybrid capabilities to a conventional vehicle, such as start-stop function as well as mild levels of torque assist and regenerative braking efficiency-improvement technology, that achieves about 15-20 percent improvement in fuel economy in urban driving.

However, the authors of the present invention have recognized a number of functional drawbacks with the current state-of-the-art in belt-driven electric motor as typically utilized in mild hybrid vehicle powertrain technology on the market today. One functional drawback is that using a single electric motor makes it necessary for frequent mode reversals because it can operate only in one mode (motoring or generating) at a time, and this results in reduced powertrain performance and fuel efficiency. Typically, the electric motor operates in a limited mechanical torque- and power-assist modes for shorter durations and generating mode producing electrical power for longer durations in order to avoid depleting the onboard energy storage devices (super-capacitors and battery bank) of a hybrid vehicle. This operating limitation results in smaller improvement in fuel efficiency.

Another functional drawback of the current state-of-the-art in belt-driven electric motors as utilized in mild hybrid vehicle powertrain technology is that they are typically optimized for one of the operating modes than the other. Therefore, in a hybrid powertrain that has such an electric motor mounted thereon, in a time period when the power demand requires the electric motor to operate in its less optimized mode, a reduced powertrain performance and fuel efficiency are achieved.

Yet another functional drawback of the current state-of-the-art in belt-driven electric motors as utilized in mild hybrid vehicle powertrain technology is that the electric motors are typically sized based on the peak power. As a result, they are relatively over-sized, heavier and less efficient in the power range corresponding to the average power demand of the drive cycle. This is done in order to be able to support start-stop features during engine idle, regenerative braking during stopping and coasting, and engine mechanical power boosting and augmentation for transient power requirements. Therefore, in a vehicle that has such an electric motor mounted thereon, in a time period when the vehicle power demand in accordance with the driving conditions requires the electric motor to operate close to the average power demand, a reduced electric motor performance and fuel efficiency are achieved.

A number of prior arts, for example U.S. Pat. No. 8,412,396, U.S. Pat. No. 5,943,918, U.S. Pat. No. 8,225,608, US2005/0107198, US2004/0040810 A1, U.S. Pat. No. 7,753,147, U.S. Pat. No. 7,914,416, US2013/0005529 A1, have described a variety of hybrid vehicles comprising single and dual electric motor-generators. However, all of these prior art patents do not address any of the drawbacks discussed above in order to improve fuel efficiency of a belt-driven parallel hybrid vehicle. The apparatus disclosed in the present invention differs significantly from those disclosed in the prior arts in terms of its characteristics and method of control.

Furthermore, no prior art in hybrid vehicle powertrain technologies and conversion of conventional vehicle into hybrid that use belt-driven electric motors coupled to the engine crankshaft via a special belt has provided solutions that address the functional drawbacks discussed above in order to achieve improvement in fuel efficiency.

Accordingly, there is a need for a simple, cost-effective and affordable hybrid vehicle powertrain technology solution that provides further improvement in fuel efficiency of the prior art mild hybrid vehicle.

BRIEF DESCRIPTION OF PREFERRED EMBODIMENTS

Disclosed in the present invention is a dual-structured power output apparatus of an electric drive and power system that is capable of improving the fuel efficiency of the prior art hybrid vehicle. It comprises dual motor/generators having two stator assemblies, two rotor assemblies and a power transmission unit (PTU) enclosed in a single compact housing 11. The power transmission unit is disposed between the two motor/generators and coupled on both ends to the rotating shafts of the two rotor assemblies such that they may be rotatable at the same speed or relative to each other at different speeds with respect to the main housing. The power transmission unit of the dual-structured power output apparatus may be constructed as a planetary gear train mechanism, or a belt drive and pulley mechanism, or an electromechanical control mechanism. A single stage planetary gear train mechanism is utilized as an exemplary embodiment of the power transmission unit to describe the embodiments of the dual-structured power output apparatus of the present invention.

In the dual-structured power output apparatus of the embodiments of the present invention, the planetary gear train mechanism includes a sun gear member, a planet carrier member and a ring gear member, and is disposed axially between the two motor/generators. The planetary gear train mechanism provides a mechanical means to increase the rotational speed of one of the electric motor/generators so that its physical size and weight are significantly reduced, and thereby resulting in reduction in the overall weight and size of the apparatus as well as improved power density and capability. In a similar manner, a pulley and timing belt mechanism or an electromechanical control mechanism may be utilized as a means for increasing the rotational speed of at least one of the electric motor/generators in order to reduce physical weight and size, and improve power density and capability.

The dual-structured power output apparatus is coupled to the engine of a hybrid vehicle powertrain via a serpentine belt, a drive pulley attached to one of its shaft and a crankshaft pulley to construct a parallel-structured hybrid vehicle powertrain. This parallel structure of a hybrid vehicle powertrain provides a means whereby the mechanical power transmitted to a drivetrain is generated by both an engine and the dual-structured power output apparatus in order to maximize fuel economy.

In accordance with the embodiments of the present invention, each of the motor/generators can function in either motoring or generating modes. The operating modes of the motor/generators are determined in accordance with the instantaneous driving conditions or state of a hybrid vehicle powertrain, and controlled based on the allocation of the electrical power to charge onboard electric energy storage devices (super-capacitors and battery bank) and mechanical torque and power to assist the engine in such a manner that improvement in fuel efficiency is achieved.

Also, disclosed is an electric drive and power system including a dual-structured power output apparatus, two bidirectional inverter/converter control units (ICCUs), a supervisory control module (SCM) and onboard electric energy storage devices. The dual-structured power output apparatus comprises two motor/generators having two rotor assemblies that may be rotatable at the same speed on a common shaft, or may include a planetary gear train mechanism disposed adjacent to the motor/generators for improved power density and capability. The planetary gear train mechanism includes at least a ring gear member, a planet carrier member and a sun gear member. The planetary gear train mechanism may be mechanically coupled on both ends to the rotor shafts of the two motor/generators such that they rotate relative to each other at different speeds with respect to the main housing 11. The SCM monitors and provides commands for executing protection functions as well as the overall electrical power and mechanical power balance between the two motor/generators, the onboard electric energy storage devices and engine in accordance with the various driving conditions of a hybrid vehicle powertrain such that the overall fuel efficiency is improved. Meanwhile, the ICCUs simultaneously drive and control the two motor/generators to operate in motoring or generating mode as directed by the SCM.

Also, disclosed in the present invention is a hybrid vehicle powertrain with the electric drive and power system mounted thereon that takes advantage of the characteristics of the dual-structured power output apparatus to achieve improvement in fuel efficiency.

Also, further disclosed in the present invention is a method for controlling the power balance during various conditions between the dual-structured power output apparatus and ICCUs, onboard electric energy storage devices and engine so that the performance of the hybrid vehicle powertrain is optimized to achieve improved fuel efficiency.

BRIEF DESCRIPTION OF THE DRAWINGS

The following descriptions should not be considered limiting in any way. With reference to the accompanying drawings, like elements are numbered alike.

DETAILED DESCRIPTION

In order to solve the functional drawbacks discussed above with the current state-of-the-art in belt-driven electric motors as utilized in power-assist parallel hybrid vehicle powertrain technology on the market today is to provide a dual-structured power output apparatus, which when incorporated into the powertrain of a hybrid vehicle or retrofitted into a conventional combustion engine vehicle, can achieve substantial improvement in the fuel efficiency.

Hereafter, the embodiments of the present invention will be described referring to the accompanying drawings that include a single stage planetary gear train mechanism as an exemplary embodiment of the power transmission unit.

Accordingly, the first object of the present invention is directed to a dual-structured power output apparatus, which no prior art has discussed, that comprises two electric motor/generators in tandem; and a planetary gear train mechanism that is axially disposed between the two motor/generators and includes a sun gear member, a planet carrier member and a ring gear member.

The second object of the present invention is to provide a control system for controlling the operating modes as well as output mechanical power and electrical power of the two electric motor/generators.

The third object of the present invention is to provide a method for controlling the output mechanical power and electrical power balance between the two electric motor/generators, the onboard electric energy storage devices and engine during various conditions of a hybrid vehicle powertrain in order to improve fuel efficiency.

A detailed description of one or more embodiments of the disclosed apparatus is presented herein by way of exemplification and not limitation with reference to the Figures. It should be understood that although a hybrid power train has been used to describe one preferable application, the example dual-structured power output apparatus illustrated in the embodiments of the present invention could be used in other applications.

First Embodiment

Figure 1:
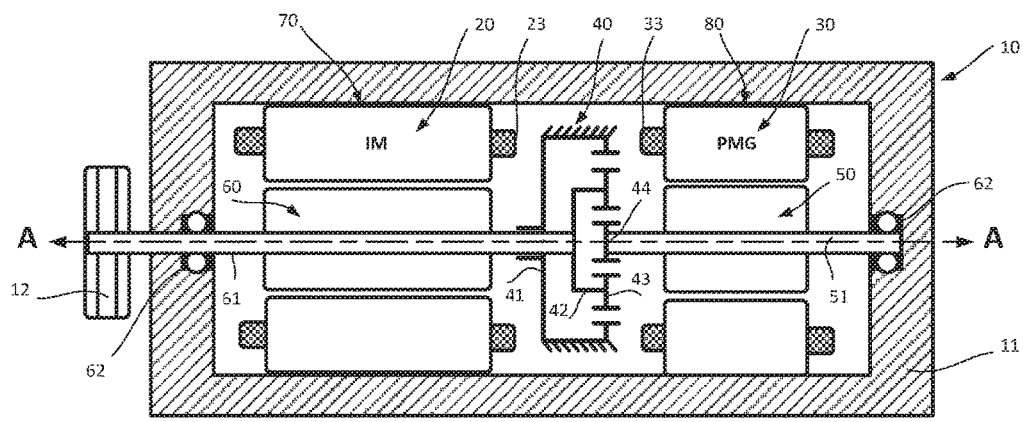
FIG. 1 is a cross-sectional view of a dual-structured power output apparatus according to a first embodiment of the present invention.
Figure 7:
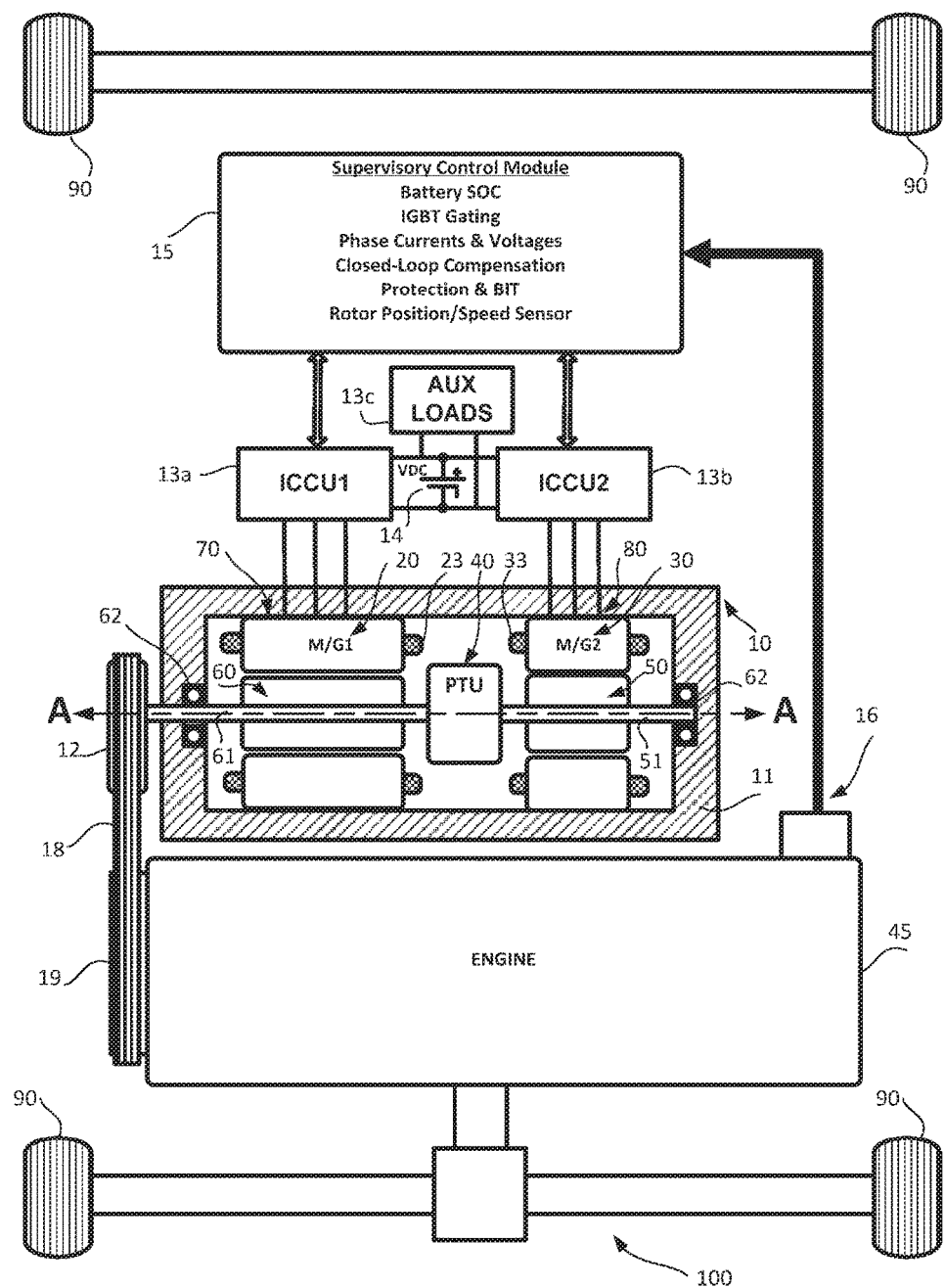
FIG. 7 illustrates a power-assist parallel hybrid vehicle powertrain application of a dual-structured electric drive and power system according to any of the embodiments of the present invention.

FIG. 1 illustrates a cross section of a dual-structured power output apparatus assembly 10 (also referred to as "assembly 10") enclosed in housing 11, according to the first embodiment of the present invention. The assembly 10 comprises a first motor/generator M/G1 assembly 70 that includes a stator assembly 20 surrounding a first rotor 60 attached to a first shaft 61; a second motor/generator M/G2 assembly 80 that includes a second stator assembly 30 surrounding a second rotor 50 attached to a second shaft 51; a planetary gear train mechanism 40 axially disposed between the first motor/generator M/G1 assembly 70 and second motor/generator M/G2 assembly 80 that includes a ring gear member 41, a planet carrier member 42 having a plurality of planets 43 mounted thereon and a sun gear member 44; and drive pulley 12 having a plurality of grooves, or sprocket having a plurality of teeth (not shown), that provides a means for coupling and torque transfer to and from crankshaft pulley 19 of a hybrid vehicle powertrain via a serpentine belt 18 as shown in FIG. 7, or flexible chain (not shown). The stator assembly 20 of the first motor/generator M/G1 assembly 70 is a stationary assembly and the rotor 60 attached to its shaft 61 rotates with respect to the stator assembly 30. Similarly, the stator assembly 30 of the second motor/generator M/G2 assembly 80 is a stationary assembly and the rotor 50 attached to its shaft 51 rotates with respect to the stator assembly 30. According to the embodiments of the present invention, the first motor/generator M/G1 assembly 70 and second motor/generator M/G2 assembly 80 are in tandem with the planetary gear train mechanism 40 axially disposed between the two motor/generators.

The function of the planetary gear train mechanism 40 in the embodiments of the present invention is primarily to function as a power transfer mechanism to receive a rotational speed and torque (or mechanical power) from the rotor 60 of the first motor/generator M/G1 assembly 70 and transmit it to the rotor 50 of the second motor/generator M/G2 assembly 80 in such a manner that the torque and rotational speed are changed in accordance with the mechanics of planetary gear train. The connection arrangements of the ring gear member 41, planet carrier member 42 and sun gear 44 of the planetary gear train mechanism 40 serve to increase the rotational speed of the rotor 50 of the second motor/generator M/G2 assembly 80 based on the rotational speed of the rotor 60 of the first motor/generator M/G1 assembly 70. Thus, increasing the rotational speed of the rotor of the second motor/generator M/G2 assembly 80 makes it possible to significantly reduce the size (diameter or axial length) of the second motor/generator assembly 80 for the transmitted mechanical power, and thereby reducing the overall weight and physical size of the apparatus assembly 10 and improved power density and capability. Furthermore, the planetary gear train mechanism 40 may be disposed to effectively utilize the radial inner space provided radially inwardly of the axially extending stator coils 23 and 33 of the first motor/generator M/G1 assembly 70 and second motor/generator M/G2 assembly 80, whereby the required overall axial dimension of the power output apparatus assembly 10 can be reduced.

In essence, the technique disclosed in the present invention of increasing the rotational speed of the rotor 50 of the second motor/generator M/G1 assembly 80 using a planetary gear train mechanism 40 effectively disposed axially in the radial inner space provided radially inwardly of the axially extending stator coils 23 and 33 makes it possible to significantly reduce the overall axial dimension of the power apparatus assembly 10, thus ensuring improved power density and capability essential for improving the fuel economy of a parallel hybrid vehicle.

Figure 6:
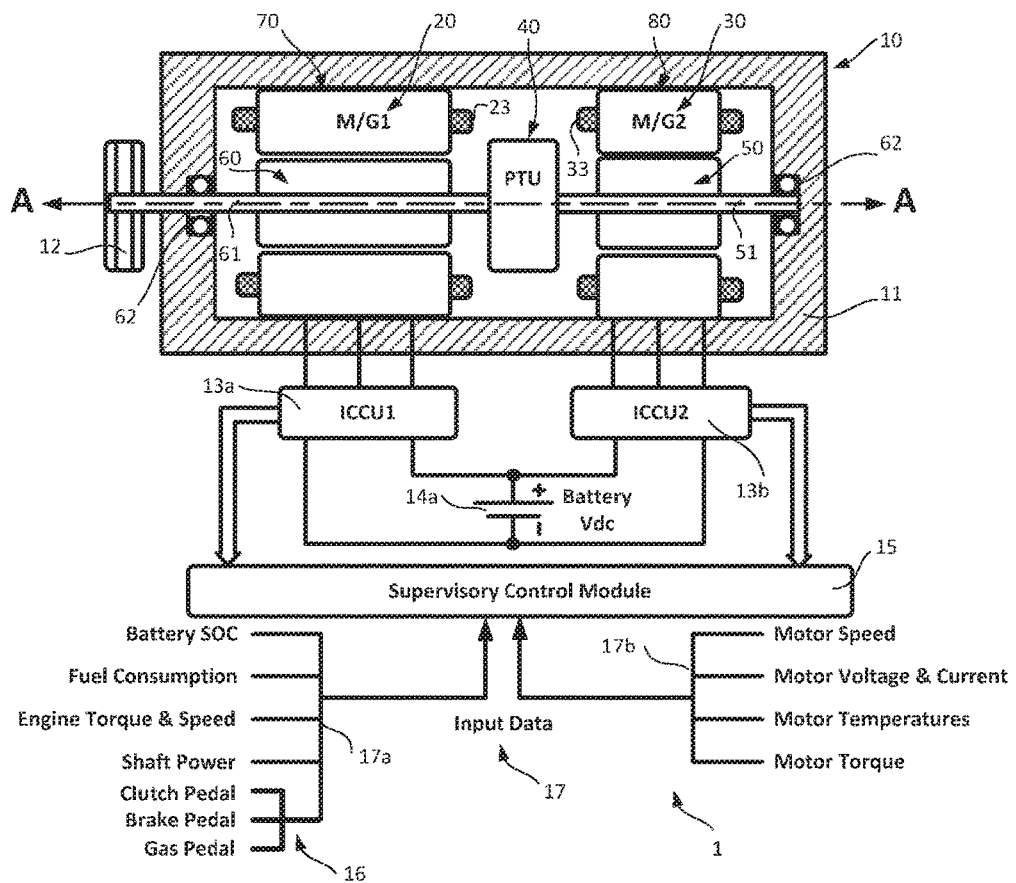
FIG. 6 illustrates an electric drive and power system to control a dual-structured power output apparatus according to any of the embodiments of the present invention.

Referring now to FIG. 6 that illustrates an electric drive and power system assembly 1 (also referred to as "assembly 1") according to an embodiment of the present invention. The assembly 1 comprises a dual-structured power output apparatus assembly 10; a first bidirectional inverter/converter control unit (ICCU1) 13a and a second bidirectional inverter/converter control unit (ICCU2) 13b; and a supervisory control module (SCM) 15 that synthesizes vehicle and motor/generator sensor input data 17 into commands for executing the overall power management and control as well as protection functions of the assembly 1. The ICCU1 13a drives and controls the first motor/generator M/G1 assembly 70 in motoring mode with electrical power from the onboard electric energy storage devices 14 to provide mechanical torque and power to an engine of a hybrid vehicle in start-up, torque-assist and power-assist modes, as well as in generating mode during regenerative braking of a hybrid vehicle during deceleration, hill descent or braking to provide electrical power to charge the onboard electric energy storage devices 14. In a similar manner, the ICCU2 13b drives and controls the second motor/generator M/G2 assembly 80 in motoring mode with electrical power from the onboard electric energy storage devices 14 to provide mechanical torque and power to an engine of a hybrid vehicle in start-up, torque-assist and power assist modes, as well as in generating mode during regenerative braking of a hybrid vehicle during deceleration, hill descent and braking to provide electrical power to charge the onboard electric energy storage devices 14. Both the first motor/generator M/G1 assembly 70 and M/G2 assembly 80 are driven and controlled simultaneously to operate in motoring and generating modes as directed by a concrete procedure of the SCM to match the driving conditions of the hybrid vehicle 100 of FIG. 7 in order to achieve improved fuel efficiency.

The dual-structured power output apparatus of the first embodiment of the present invention in FIG. 1 works in accordance with the operational principles described below. In the assembly 10 of this embodiment, the first planetary gear member is a ring gear member 41 that is not rotatable, the second planetary gear member is a planet carrier member 42 that is rotatable, and the third planetary gear member is a sun gear member 44 that is rotatable. Hollow shafts having internal splines are formed integrally with the planet carrier 42 and sun gear 41 for mechanical coupling with external splines integrally formed on the rotor shaft 61 and shaft 51 of the first motor/generator M/G1 assembly 70 and second motor/generator M/G2 assembly 80. The planetary gear train mechanism 40 is disposed to effectively utilize the radial inner space provided radially inwardly of the axially extending stator coils 23 and 33 of the first motor/generator M/G1 assembly 70 and second motor/generator M/G2 assembly 80, whereby the required overall axial dimension of the power output apparatus assembly 10 can be reduced; and it is coupled to the rotor shaft 61 of the first motor/generator M/G1 assembly 70 and the rotor shaft 51 of the second motor/generator MG2 assembly 80. The rotor shaft 61 of the first motor/generator M/G1 assembly 70 is the drive shaft and on one end is attached a drive pulley 12 having a plurality of grooves as shown in FIG. 7, or sprocket having a plurality of teeth (not shown), for coupling and torque transfer to and from the engine 45 crankshaft pulley 19 via a high tension serpentine belt 18 or flexible chain. The other end of the rotor shaft 61 of the first motor/generator M/G1 assembly 70 is connected to the planet carrier member 42. When the rotor shaft 61 of first motor/generator M/G1 assembly 70 rotates, the planet carrier member 42 of the planetary gear train mechanism 40 rotates at the same speed and the rotor shaft 51 of the second motor/generator M/G2 assembly 80 connected to the sun gear member 44 of the planetary gear train mechanism 40 also rotates. Based on the mechanics of planetary gear, the rotating speed and torque relationships at every instant in time for the rotor shaft 61 and shaft 51 and planetary gear train mechanism 40 can be expressed by Equations (1) through (4) as follows:

$$T_{sh1} = \pm T_{MG1} \tag{1}$$

$$T_{sh2} = \pm T_{MG2} = \left(\frac{1}{1+\varepsilon}\right) T_{sh1} \tag{2}$$

$$\Omega_{sh1} = \alpha \Omega_{ec} \tag{3}$$

$$\Omega_{sh2} = (1 + \varepsilon) \Omega_{sh1} \tag{4}$$

In Equations (1) and (4), the "±" (plus and minus) sign presents the direction of a motor/generator applied torque such that a "+" (plus) sign denotes motoring mode torque that is applied in the direction of rotation of the rotor shaft, and a "−" (minus) sign denotes generating mode torque that is applied in the reverse direction of rotation of the rotor shaft; $\Omega sh1$ represents the rotational speed of the rotor shaft 61 of the first motor/generator M/G1 70; $\Omega sh2$ represents the rotational speed of the rotor shaft 51 of the second motor/generator M/G2 80; $\Omega ec$ represents the rotational speed of the engine 45 crankshaft pulley 19. Meanwhile, $T_{MG1}$ represents the torque applied by the first motor/generator M/G1 assembly 70 and, depending on its sign, it is transmitted to the crankshaft pulley 19 as positive or negative amount of torque assist by which the engine-produced torque is reduced or increased; Tsh1 represents the torque applied to the rotor shaft 61 and is equal to the torque $T_{MG1}$ applied by the first motor/generator M/G1 assembly 70; and Tsh2 represents the torque transmitted to the sun gear and rotor shaft 51 due to the rotor shaft 61 torque Tsh1. Meanwhile, ε represents the gear ratio, as expressed below in Equation (5), of the number of teeth of the ring gear member 41 to that of the sun gear member 44. This ratio is always greater than 1.

$$\varepsilon = \left(\frac{\text{the number of teeth of the ring gear member}}{\text{the number of teeth of the sun gear member}}\right) \tag{5}$$

Also, α denotes the pulley drive ratio, as defined in Equation (6), and is defined as the ratio of the outer pitch diameter of the crankshaft pulley 19 to that of the pulley 12 of the apparatus assembly 10. This ratio is typically between 1 and 3.

$$\alpha = \left(\frac{\text{the outer pitch diameter of the crankshaft pulley}}{\text{the outer pitch diameter of the assembly 10 pulley}}\right) \tag{6}$$

In accordance with Equation (4), the sun gear member 44 and the connected rotor shaft 51 of the second motor/generator M/G2 assembly 80 rotate at a higher speed than the assembly 10 pulley 12 and the rotor shaft 61 of the first motor/generator M/G1 assembly 70. As a result, the size of second motor/generator M/G2 assembly required to match the required power demand is significantly reduced. Thus, as described earlier, the function of the planetary gear train mechanism 40 in the embodiments of the present invention is to increase the rotational speed of the sun gear 44 and rotor shaft 51 of the second motor/generator M/G2 assembly 80 so that its size is significantly reduced, resulting in reduction of the overall weight and physical size of the apparatus, which in turn ensures improved power density and capability.

In other words, the planetary gear train mechanism 40 is arranged to primarily function as a power transfer mechanism to receive a rotational speed and torque (that is mechanical power) from the first motor/generator M/G1 assembly 70 and transmit it to the second motor/generator M/G2 assembly 80 in such a manner that the torque is scaled down and rotational speed is scaled up in accordance with planetary gear train mechanics to maintain the mechanical power. Specifically, the planetary gear mechanism is serving to transfer the mechanical power provided by the first motor/generator M/G1 assembly 70 by increasing the rotational speed and decreasing the torque of the second motor/generator M/G2 assembly 80 in accordance with the mechanics of planetary gear train as given in Equations (1) through (4). Accordingly, the size of the second motor/generator M/G2 assembly 80 required to match the mechanical power transferred from the rotor shaft 61 of the first motor/generator M/G1 assembly 70 is smaller than the size of the first motor/generator M/G1 assembly 70. Therefore, the second motor/generator M/G2 assembly 80 is constructed to have a smaller size than the first motor/generator M/G1 assembly 70, thereby significantly reducing the overall physical size and weight of the apparatus and ensuring improved power density and capability.

In summary, the technique disclosed in this embodiment of the present invention of increasing the speed of the rotor 50 of the second motor/generator M/G1 assembly 80 using a planetary gear train mechanism 40 effectively disposed axially in the radial inner space provided radially inwardly of the axially extending stator coils 23 and 33 makes it possible to significantly reduce the overall axial dimension of the power apparatus assembly 10, thus ensuring improved power density and capability essential for improving the fuel economy of a parallel hybrid vehicle.

For stable operation of this embodiment of the dual-structured power output apparatus assembly 10 of FIG. 1, it is essential that the first motor/generator M/G1 assembly 70 and second motor/generator M/G2 assembly 80 maintain dynamic equilibrium at all instants in time. This implies that the torque $T_{MG1}$ applied by the first motor/generator M/G1 assembly 70 and torque $T_{MG2}$ applied by the second motor/generator M/G2 assembly 80 must be in dynamic equilibrium at all instants in time in accordance with Equation (2). The ICCU1 13a and ICCU2 13b must drive and control the first motor/generator M/G1 assembly 70 and second motor/generator M/G2 assembly 80 according to the torque and speed relationships given in Equations (1) through (4) in order to maintain dynamic equilibrium at all instants in time.

When it is determined by a concrete procedure of the SCM 15 that the driving mode of the hybrid vehicle powertrain 100 in FIG. 7 requires both motoring mode torque to assist the engine 45 and generating mode electrical power for charging the onboard electric energy storage devices 14, one of the motor/generators is driven and controlled in motoring mode and the other is driven and controlled in the generate mode. It will understood in the present invention that this means the ICCU1 13a must drive and control the first motor/generator M/G1 assembly 70 to produce torque TMG1 applied in the direction of its rotor shaft 61 rotation so that it works as a motor and the ICCU2 13b must drive and control the second motor/generator M/G2 assembly 80 to produce torque TMG2 applied in the reverse direction of its rotor shaft 51 rotation so that it operates as a generator to convert mechanical power to electrical power for charging the onboard electric energy storage devices 14. This must be accomplished simultaneously such that the torque TMG1 produced by the first motor/generator M/G1 assembly 70 is related to the output shaft torque Tsh2 on the sun gear 44 and rotor shaft 51 according to the expression given in Equation (7) below.

$$T_{sh2} = -T_{MG2} = \left(\frac{1}{1+\varepsilon}\right)T_{sh1} \qquad (7)$$

When it is determined by a concrete procedure of the SCM 15 that the driving mode of the hybrid vehicle powertrain 100 in FIG. 7 requires only torque assist and augmentation, such as during acceleration and hill climbing, both motor/generators may be driven and controlled in motoring mode as an option. Therefore, this will be understood in the present invention to mean that the ICCU1 13a must drive and control the first motor/generator M/G1 assembly 70 and ICCU2 13b must drive and control the second motor/generator M/G2 assembly 80 such that their torques $T_{MG1}$ and $T_{MG2}$ are applied in the directions of rotation as their associated rotor shaft 61 and shaft 51, and thereby they both work as motors. For stable operation of the hybrid powertrain 100, it is essential that dynamic equilibrium must be maintained by satisfying Equation (8) at all instants in time. Also, depending on the acceleration and augmentation demands, one of the two motor/generators of the assembly 10 may be capable of delivering the required motoring torque.

$$T_{MG2} = \left(\frac{1}{1+\varepsilon}\right)T_{MG1} = \left(\frac{1}{1+\varepsilon}\right)T_{sh1} \qquad (8)$$

When it is determined by a concrete procedure of the SCM 15 that the driving mode of the hybrid vehicle powertrain 100 in FIG. 7 requires regenerative braking, such as decelerating or descending a hill, wherein the torque available at the vehicle drivetrain and wheels 90 exceeds that required by the engine 45 to propel the vehicle, both the first motor/generator M/G1 assembly 70 and second motor/generator M/G2 assembly 80 may be driven and controlled to produce electrical power for charging the onboard electric energy storage devices 14. Therefore, this will be understood in the present invention to mean that the ICCU1 13a must drive and control first motor/generator M/G1 assembly 70 to provide torque $T_{MG1}$ and ICCU2 13b must drive and control the second motor/generator M/G2 assembly 80 to provide torque $T_{MG2}$ that are both applied in the reverse directions of rotation of their associated rotor shafts 61 and 51, thereby they both work as generators in accordance with Equation (9).

$$T_{sh2} = -T_{MG2} = -\left(\frac{1}{1+\varepsilon}\right)T_{MG1} \qquad (9)$$

Second Embodiment

Figure 2:
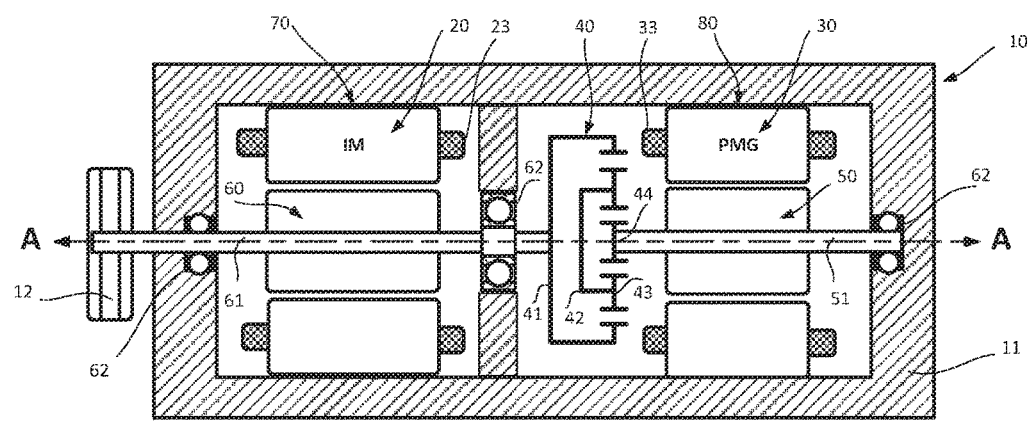
FIG. 2 is a cross-sectional view of a electric dual-structured power output apparatus according to a second embodiment.

A dual-structured power output apparatus in a second embodiment of the present invention is discussed below. FIG. 2 illustrates a cross section of a dual-structured power output apparatus assembly 10 in the second embodiment of the present invention. In this embodiment, the assembly 10 comprises a first motor/generator M/G1 assembly 70, a second motor/generator M/G2 assembly 80 and a planetary gear train mechanism 40. The difference from the first embodiment is that in the second embodiment the ring gear member 41 of the planetary gear train mechanism 40 is not held stationary and rotatable with respect to the main housing 11. The planetary gear train mechanism 40 includes a ring gear member 41 that is rotatable, a planet carrier member 42 that is freely rotatable and a sun gear member 44 that is rotatable. Hollow shafts having internal splines are formed integrally with the ring gear 41 and sun gear 44 for mechanical coupling with external splines integrally formed on the rotor shaft 61 and shaft 51 of the first motor/generator M/G1 assembly 70 and second motor/generator M/G2 assembly 80. The planetary gear train mechanism 40 is disposed to effectively utilize the radial inner space provided radially inwardly of the axially extending stator coils 23 and 33 of the first motor/generator M/G1 assembly 70 and second motor/generator M/G2 assembly 80, whereby the required overall axial dimension of the power output apparatus assembly 10 can be reduced; and it is coupled to the rotor shaft 61 of the first motor/generator M/G1 assembly 70 and the rotor shaft 51 of the second motor/generator MG2 assembly 80. The rotor shaft 61 of the first motor/generator M/G1 assembly 70 is the drive shaft supported by bearings 62 with a drive pulley 12 having a plurality of grooves as shown in FIG. 7, or sprocket having a plurality of teeth (not shown), attached on one end for coupling and torque transfer to and from the engine 45 crankshaft pulley 19 via a high tension serpentine belt 18, flexible chain or other suitable means. The other end of the rotor shaft 61 of the first motor/generator M/G1 assembly 70 is coupled to the ring gear member 41 of the planetary gear train mechanism 40 so that they rotate at the same speed. When the rotor shaft 61 of first motor/generator M/G1 assembly 70 rotates, the ring gear member 41 of the planetary gear train mechanism 40 rotates at the same speed, the planet carrier member 42 of the planetary gear 40 rotates at a different speed higher than the speed of the ring gear member 41, and the sun gear member 44 of the planetary gear 40 which is coupled to the rotor shaft 51 of the second motor/generator M/G2 assembly 80 rotates at a different speed that is higher than the speed of the planet carrier member 42. The relationships at every instants in time between the rotational speeds and torques for the motor/generator rotor shafts 61 and 51, ring gear member 41, planetary carrier member 42 and sun gear member 44 of the planetary gear train mechanism 40 are expressed in Equations (10) through (14).

$$T_{pc} = \pm\left(\frac{1+\varepsilon}{\varepsilon}\right)T_{MG1} \qquad (10)$$

-continued $$T_{sh1} = \pm T_{MG1} \tag{11}$$

$$T_{sh2} = \pm T_{MG2} = \left(\frac{1}{\varepsilon}\right) T_{sh1} \tag{12}$$

$$\Omega_{sh1} = \alpha \Omega_{ec} \tag{13}$$

$$\Omega_{sh2} = (1+\varepsilon)\Omega_{pc} - \varepsilon \Omega_{sh1} \tag{14}$$

In Equations (10) through (14), the "±" (plus and minus) sign presents the direction of a motor/generator applied torque such that a "+" (plus) sign denotes motoring mode torque that is applied in the direction of rotation of the rotor shaft, and a "−" (minus) sign denotes generating mode torque that is applied in the reverse direction of rotation of the rotor shaft; $T_{MG1}$ represents the torque applied by the first motor/generator M/G1 assembly 70 and, depending on its sign, it is transmitted to the crankshaft pulley 19 as positive or negative amount of torque assist by which the engine-produced torque is reduced or increased; $T_{MG2}$ represents the torque applied by the second motor/generator M/G2 assembly 80 and, depending on its sign, it is transmitted to the crankshaft pulley 19 as positive or negative amount of torque assist by which the engine-produced torque is reduced or increased; Tsh1 represents the torque applied to the rotor shaft 61 and is equal to the torque applied by the first motor/generator M/G1 assembly 70; Tpc represents the torque transmitted to the planet carrier member 42 due to the rotor shaft 61 torque Tsh1; and Tsh2 represents the torque transmitted to the sun gear 44 and rotor shaft 51 due to the rotor shaft 61 torque Tsh1. Meanwhile, Ωsh2 represents the rotational speed of the sun gear member 44 and rotor shaft 51; Ωsh1 represents the rotational speed of the rotor shaft 61 of the first motor/generator M/G1 assembly 70 and the assembly 10 pulley 12; $\Omega_{pc}$ represents the rotational speed of the planet carrier member 42; and $\Omega_{ec}$ represents the engine 45 crankshaft pulley 19 rotational speed. The gear ratio ε is as defined in Equation (5) and pulley drive ratio α is as defined in Equation (6).

As described earlier, the planetary gear train mechanism 40 is arranged to primarily function as a power transfer mechanism to receive a rotational speed and torque (that is mechanical power) from the first motor/generator M/G1 assembly 70 and transmit it to the second motor/generator M/G2 assembly 80 in such a manner that the torque is scaled down and rotational speed is scaled up in accordance with planetary gear train mechanics to maintain the mechanical power. Specifically, the planetary gear mechanism is serving to transfer the mechanical power provided by the first motor/generator M/G1 assembly 70 by increasing the rotational speed and decreasing the torque of the second motor/generator M/G2 assembly 80 in accordance with the mechanics of planetary gear as given in Equations (10) through (14). Accordingly, the size of the second motor/generator M/G2 assembly 80 required to match the mechanical power transferred from the rotor shaft 61 of the first motor/generator M/G1 assembly 70 is smaller than the size of the first motor/generator M/G1 assembly 70. Therefore, the second motor/generator M/G2 assembly 80 is constructed to have a smaller size than the first motor/generator M/G1 assembly 70, thereby significantly reducing the overall physical size and weight of the apparatus and ensuring improved power density and capability.

In essence, the technique disclosed in this embodiment of the present invention of increasing the rotational speed of the rotor 50 of the second motor/generator M/G1 assembly 80 using a planetary gear train mechanism effectively disposed axially in the radial inner space provided radially inwardly of the axially extending stator coils 33 and 23 makes it possible to significantly reduce the overall axial dimension of the power apparatus assembly 10, thus ensuring improved power density and capability essential for improving the fuel economy of a parallel hybrid vehicle.

One aspect of the second embodiment of the present invention is that the rotational speed $\Omega_{pc}$ of the planet carrier member 42 is not set and it depends on the rotating speeds of the ring gear 41 and sun gear 44 members. Based on the rotational speed relationship given in Equation (14), the determination of the rotating speeds of any of the two gear members automatically results in setting the rotating speed of the remaining planetary gear member. In essence, this provides one degree of freedom to set the rotating speed and mechanical power of the sun gear 44, and hence the rotating speed of the second motor/generator M/G2 assembly 80 rotor shaft 51. For a given engine torque and speed, a preferable choice is the rotating speed that gives the maximum possible efficiency, thereby enhancing the efficiency of the whole apparatus. Dynamic equilibrium of the first motor/generator M/G1 assembly 70 applied torque $T_{MG1}$ and second motor/generator M/G2 assembly 80 applied torque $T_{MG2}$ is essential for stable operation. This is accomplished by satisfying the torque and speed relationships given in Equations (10) through (14).

When it is determined by a concrete procedure of the SCM 15 that the driving mode of the hybrid vehicle powertrain 100 in FIG. 7 requires both motoring mode torque to assist the engine 45 and generating mode electrical power to charge the onboard electric energy storage devices 14, one of the motor/generators is driven and controlled in motoring mode and the other is driven and controlled in generating mode. This requires that the ICCU1 13a must drive and control the first motor/generator M/G1 assembly 70 to produce torque $T_{MG1}$ applied in the direction of its rotor shaft 61 rotation so that it works as a motor and ICCU2 13b must drive and control the second motor/generator M/G2 assembly 80 to produce torque $T_{MG2}$ applied in the reverse direction of its rotor shaft 51 rotation so that it operates as a generator to convert mechanical power to electric power for charging the onboard electric energy storage devices 14. This must be accomplished simultaneously under dynamic conditions such that the relationship between the torque $T_{MG1}$ applied by the first motor/generator M/G1 assembly 70 and torque $T_{MG2}$ applied by the second motor/generator M/G2 assembly 80 is in accordance with Equation (15).

$$T_{sh2} = -T_{MG2} = \left(\frac{1}{\varepsilon}\right) T_{MG1} \tag{15}$$

When it is determined by a concrete procedure of the SCM 15 that the driving mode of the hybrid vehicle powertrain 100 in FIG. 7 requires only torque assist mode and augmentation, such as during acceleration and hill climbing, one or both of the motor/generators may be driven and controlled in motoring mode. For the control option to drive and control both motor/generators, it will be understood in the present invention that the ICCU1 13a must drive and control the first motor/generator M/G1 assembly 70 and ICCU2 13b must drive and control the second motor/generator M/G2 assembly 80 to produce torque $T_{MG1}$ and torque $T_{MG2}$ simultaneously applied in the directions of rotation of their associated rotor shaft 61 and shaft 51 so that they both work as motors. For stable operation of the hybrid vehicle powertrain 100, it is essential that dynamic equilibrium must be maintained by satisfying Equation (16) at all instants in time. Also, depending on the acceleration and augmentation requirements, one of the two motor/generators may be capable of providing the required motoring torque.

$$T_{sh2} = T_{MG2} = \left(\frac{1}{\varepsilon}\right)T_{MG1} \tag{16}$$

When it is determined by a concrete procedure of the SCM 15 that the driving mode of the hybrid vehicle powertrain 100 in FIG. 7 involves some regenerative braking, such as during deceleration or descending a hill, the first motor/generator M/G1 assembly 70 and the second motor/generator M/G2 assembly 80 may both be driven and controlled simultaneously to generate electrical power for charging the onboard electric energy storage devices 14. It will be understood in the present invention that this is accomplished by having the ICCU1 13a drive and control the first motor/generator M/G1 70 assembly to produce torque $T_{MG1}$ and ICCU2 13b drive and control the second motor/generator M/G2 assembly 80 to produce torque $T_{MG2}$ that are both simultaneously applied in the reverse directions of rotation of their associated rotor shaft 61 and shaft 51 so that they both work as generators in accordance with Equation (17).

$$T_{sh2} = -T_{MG2} = -\left(\frac{1}{\varepsilon}\right)T_{MG1} \tag{17}$$

Third Embodiment

Figure 3:
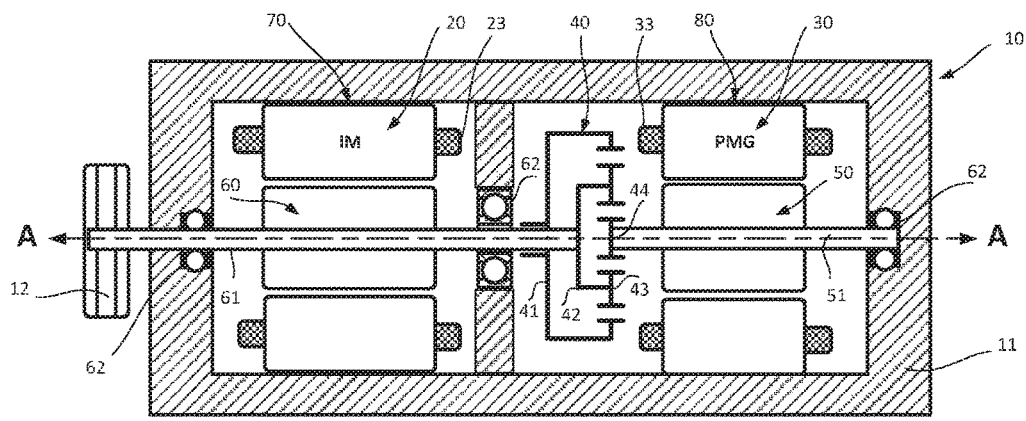
FIG. 3 is a cross-sectional view of a dual-structured power output apparatus according to a third embodiment.

A dual-structured power output apparatus in a third embodiment of the present invention is discussed below. FIG. 3 illustrates a cross section of the third embodiment of a dual-structured power output apparatus assembly 10 of the present invention. In this embodiment, the assembly 10 comprises a first motor/generator M/G1 assembly 70, a second motor/generator M/G2 80 and a planetary gear train 40. The first planetary gear train 40 member is a ring gear member 41 that is freely rotatable, the second is a planet carrier member 42 that is rotatable, and the third is a sun gear member 44 that is also rotatable. Hollow shafts having internal splines are formed integrally with the planet carrier 42 and sun gear 41 for mechanical coupling with external splines integrally formed on the rotor shaft 61 and shaft 51 of the first motor/generator M/G1 assembly 70 and second motor/generator M/G2 assembly 80. The planetary gear train mechanism 40 is disposed to effectively utilize the radial inner space provided radially inwardly of the axially extending stator coils 23 and 33 of the first motor/generator M/G1 assembly 70 and second motor/generator M/G2 assembly 80, whereby the required overall axial dimension of the power output apparatus assembly 10 can be reduced; and it is coupled to the rotor shaft 61 of the first motor/generator M/G1 assembly 70 and the rotor shaft 51 of the second motor/generator MG2 assembly 80. The rotor shaft 61 of the first motor/generator M/G1 assembly 70 is the drive shaft supported by bearings 62 and attached on one end is a drive pulley 12 having a plurality of grooves as shown in FIG. 7, or sprocket having a plurality of teeth (not shown), for coupling and torque transfer to and from the engine 45 crankshaft pulley 19 via a high tension serpentine belt 18, flexible chain or other suitable means. In this embodiment, the rotor shaft 61 of the first motor/generator M/G1 assembly 70 is connected to the planet carrier member 42 of the planetary gear train mechanism 40 so that they both rotate together. When the rotor shaft 61 of the first motor/generator M/G1 assembly 70 rotates, the planetary carrier member 42 of the planetary gear train mechanism 40 rotates at the same speed, the ring gear member 41 rotates at a different speed that is lower than the speed of the planet carrier 42, and the sun gear member 44 connected to the rotor shaft 51 of the second motor/generator M/G2 assembly 80 rotates at a different speed that is higher than the speed of the planet carrier member 42. The relationships between the rotational speeds and torques for the two motor/generator rotor shaft 61 and shaft 51, and ring gear 41, planet carrier 42 and sun gear 44 of the planetary gear train mechanism 40 are expressed in Equations (18) through (22).

$$T_{sh1} = \pm T_{MG1} \tag{18}$$

$$T_{sh2} = \pm T_{MG2} = \pm\left(\frac{1}{1+\varepsilon}\right)T_{MG1} \tag{19}$$

$$T_{pr} = \pm\left(\frac{\varepsilon}{1+\varepsilon}\right)T_{MG1} \tag{20}$$

$$\Omega_{sh2} = (1+\varepsilon)\Omega_{sh1} - \varepsilon\Omega_{pr} \tag{21}$$

$$\Omega_{sh1} = \alpha\Omega_{ec} \tag{22}$$

In Equations (18) through (22), the "+" (plus and minus) sign presents the direction of a motor/generator applied torque such that a "+" (plus) sign denotes motoring mode torque that is applied in the direction of rotation of the rotor shaft, and a "−" (minus) sign denotes generating mode torque that is applied in reverse direction of rotation of the rotor shaft; $T_{MG1}$ represents the torque applied by the first motor/generator M/G1 assembly 70 and, depending on its sign, it is transmitted to the crankshaft pulley 19 as positive or negative amount of torque assist by which the engine-produced torque is reduced or increased; in a similar manner, $T_{MG2}$ represents the torque applied by the second motor/generator M/G2 assembly 80 and, depending on its sign, it is transmitted to the crankshaft pulley 19 as positive or negative amount of torque assist by which the engine-produced torque is reduced or increased; Tsh1 represents the torque applied to the rotor shaft 61 and is equal to the torque applied by the first motor/generator M/G1 assembly 70; Tpr represents the torque transmitted to the ring gear member 41 due to the rotor shaft 61 torque Tsh1; and Tsh2 represents the torque transmitted to the sun gear 44 and rotor shaft 51 due to the shaft 61 torque Tsh1. Meanwhile, Ωsh2 represents the rotational speed of the sun gear member 44 and rotor shaft 51; Ωsh1 represents the rotational speed of the rotor shaft 61 of the first motor/generator M/G1 assembly 70 and the assembly 10 pulley 12; $\Omega_{pr}$ represents the rotational speed of the planet carrier member 42; and $\Omega_{ec}$ represents the engine 45 crankshaft pulley 19 rotational speed. The gear ratio ε is as defined earlier in Equation (5) and pulley drive ratio α is as defined in Equation (6).

As described earlier, the planetary gear train mechanism 40 is arranged to primarily function as a power transfer mechanism to receive a rotational speed and torque (that is mechanical power) from the first motor/generator M/G1 assembly 70 and transmit it to the second motor/generator M/G2 assembly 80 in such a manner that the torque is scaled down and rotational speed is scaled up in accordance with planetary gear train mechanics to maintain the mechanical power. Specifically, the planetary gear mechanism is serving to transfer the mechanical power provided by the first motor/generator M/G1 assembly 70 by increasing the rotational speed and decreasing the torque of the second motor/generator M/G2 assembly 80 in accordance with the mechanics of planetary gear as given in Equations (18) through (22). Accordingly, the size of the second motor/generator M/G2 assembly 80 required to match the mechanical power transferred from the rotor shaft 61 of the first motor/generator M/G1 assembly 70 is smaller than the size of the first motor/generator M/G1 assembly 70. Therefore, the second motor/generator M/G2 assembly 80 is constructed to have a smaller size than the first motor/generator M/G1 assembly 70, thereby significantly reducing the overall physical size and weight of the apparatus and ensuring improved power density and capability.

In essence, the technique disclosed in this embodiment of the present invention of increasing the rotational speed of the rotor 50 of the second motor/generator M/G1 assembly 80 using a planetary gear train mechanism effectively disposed axially in the radial inner space provided radially inwardly of the axially extending stator coils 23 and 33 makes it possible to significantly reduce the overall axial dimension of the power apparatus assembly 10, thus ensuring improved power density and capability essential for improving the fuel economy of a parallel hybrid vehicle.

One aspect of this embodiment of the present invention is that the speed $\Omega_{pr}$ of the ring gear 41 is not set and it depends on the rotating speeds of the planet carrier 42 and the sun gear 44. Based on the planetary gear train speed relationship given in Equation (21), the determination of the rotating speeds of any of the two gear members, automatically sets the rotating speed of the remaining member of the planetary gear train mechanism 40. In essence, this provides one degree of freedom to set the rotating speed and power of the sun gear 51, and hence the rotating speed of the rotor shaft 51 of the second motor/generator M/G2 assembly 80. For a given engine 45 speed and torque at the crankshaft pulley 19, a preferable choice is to operate the sun gear 44 and rotor shaft 51 at a rotational speed that yields the maximum possible efficiency, thereby enhancing the overall efficiency of the whole apparatus. Based on the mechanics of planetary gear train mechanism 40, dynamic equilibrium is essential for stable operation. That is, for dynamic equilibrium to be maintained, the torque $T_{MG1}$ applied by the first motor/generator M/G1 assembly 70 and torque $T_{MG2}$ applied by the second motor/generator M/G2 assembly 80 must satisfy the torque and rotational speed relationships given in Equations (18) through (22) above.

When it is determined by a concrete procedure of the SCM 15 that the driving mode of the hybrid vehicle powertrain 100 in FIG. 7 requires both motoring mode torque to assist the engine 45 and generating mode electrical power to charge the onboard electric energy storage devices 14, one of the motor/generators is driven and controlled in motoring mode and the other is driven and controlled in generating mode. Therefore, the ICCU1 must drive and control the first motor/generator M/G1 assembly 70 to provide torque $T_{MG1}$ applied in the direction of its rotor shaft 61 rotation so that it works as a motor. Similarly, the ICCU2 must drive and control the second motor/generator M/G2 assembly 80 to provide torque $T_{MG2}$ applied in the reverse direction of rotation of its rotor shaft 51 rotation so that it works as a generator to convert mechanical power to electrical power to charge the electric energy storage devices 14. This must be accomplished under dynamic conditions such that the relationship between the torque $T_{MG1}$ applied by the first motor/generator M/G1 assembly 70 and torque $T_{MG2}$ applied by the second motor/generator M/G2 assembly 80 is in accordance with Equation (23).

$$T_{sh2} = -T_{MG2} = -\left(\frac{1}{1+\varepsilon}\right)T_{MG1} \tag{23}$$

When it is determined by a concrete procedure of the SCM 15 that the driving mode of the hybrid vehicle powertrain 100 in FIG. 7 requires motoring for torque assist and augmentation, such as during acceleration and hill climbing, one or both of the motor/generators may be driven and controlled in motoring mode. For the control option to drive and control both motor/generators in motoring mode, the ICCU1 must drive and control the first motor/generator M/G assembly 70 and ICCU2 must drive and control the second motor/generator M/G2 assembly 80 to produce torque $T_{MG1}$ and torque $T_{MG2}$ simultaneously applied in the directions of rotation of their associated rotor shaft 61 and shaft 51 so that they both work as motors. For stable operation of the hybrid vehicle powertrain 100, it is essential that dynamic equilibrium must be maintained by satisfying Equation (24) at all instants in time. In addition, depending on the torque assist and augmentation requirements, one of the two motor/generators may be capable of providing the torque needed.

$$T_{sh2} = -T_{MG2} = \left(\frac{1}{1+\varepsilon}\right)T_{MG1} \tag{24}$$

When it is determined by a concrete procedure of the SCM 15 that the driving mode of the hybrid vehicle powertrain 100 in FIG. 7 involves some regenerative braking, such as during deceleration or descending a hill, the first motor/generator M/G1 assembly 70 and the second motor/generator M/G2 assembly 80 may both be driven and controlled simultaneously to generate electrical power for charging the onboard electric energy storage devices 14. This will be understood to be accomplished by having the ICCU1 13a drive and control the first motor/generator M/G1 70 assembly to produce torque $T_{MG1}$ and ICCU2 13b drive and control the second motor/generator M/G2 assembly 80 to produce torque $T_{MG2}$ that are both simultaneously applied in the reverse directions of rotation of their associated rotor shaft 61 and shaft 51 so that they both work as generators in accordance with Equation (25).

$$T_{sh2} = -T_{MG1} = -\left(\frac{1}{1+\varepsilon}\right)T_{MG1} \tag{25}$$

Fourth Embodiment

Figure 4:
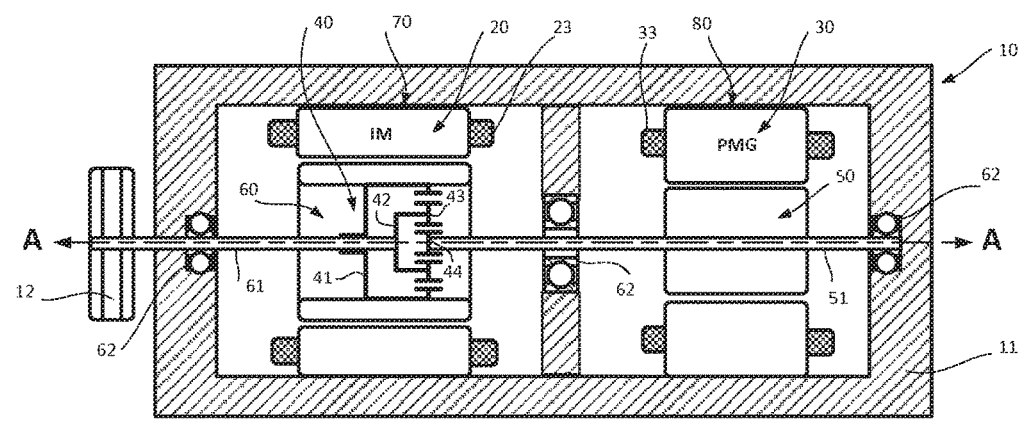
FIG. 4 is a cross-sectional view of dual-structured power output apparatus according to a fourth embodiment.

A dual-structured power output apparatus in a fourth embodiment of the present invention is discussed below. FIG. 4 illustrates a cross section of the fourth embodiment of a dual-structured power output apparatus assembly 10 of the present invention. The difference from the first, second and third embodiments of the present invention is that the planetary gear train mechanism 40 is axially disposed within a cavity of one of the rotors of the two motor/generators rather than between the two motor generators. Also, the configuration of the fourth embodiment makes it possible to further reduce the axial length of the apparatus, thus further improving the output power density and capability. In this particular embodiment, the assembly 10 comprises a first motor/generator M/G1 assembly 70, a second motor/generator M/G2 80, and a planetary gear train mechanism 40 that is axially disposed at least partially within an inner cavity of the rotor formed by the inner diameter of the rotor 60 of the first motor/generator M/G1 assembly 70. The planetary gear train mechanism 40 may be preferably fabricated separately and installed into a cavity formed by the inner diameter of the rotor 60 of the first motor/generator M/G1 assembly 70. The first planetary gear train mechanism 40 member is a ring gear member 41 that is freely rotatable, the second is a planet carrier member 42 that is rotatable, and the third is a sun gear member 44 that is rotatable. The planetary gear train mechanism 40 is coupled to the first rotor shaft 61 on one side via the planet carrier 42, rotor assembly 60 via the ring gear and second rotor shaft 51 via the sun gear 44. The rotor shaft 61 of the first motor/generator M/G1 assembly 70 and rotor shaft 51 of the second motor/generator M/G2 assembly 80 are suitably supported by bearings 62. On one end of the first rotor shaft 61 is installed the assembly 10 pulley 12 having a plurality of grooves, or sprocket having a plurality of teeth, for coupling and torque transfer to and from the engine 45 crankshaft pulley 19 via a high tension serpentine belt 18, or flexible chain. When the first rotor shaft 61 connected to the assembly 10 pulley 12 rotates, the planet carrier member 42 of the planetary gear train mechanism 40 rotates at the same speed, and the ring gear 41 of the planetary gear train mechanism 40 which is freely rotatable and rotor assembly 60 of the first motor/generator M/G1 assembly 80 rotate together, wherein the rotor 60 may be driven appropriately to a set rotating speed point, and the sun gear member 44 connected to the rotor shaft 51 of the second motor/generator M/G2 assembly 80 rotates at a different speed. The rotational speed and torque relationships for the first rotor shaft 61, second rotor shaft 51, rotor assembly 60, as well as the ring gear 41, planet carrier 42 and sun gear 44 of the planetary gear train mechanism 40 are expressed in Equations (26) through (29).

$$T_{sh1} = \pm\left(\frac{1+\varepsilon}{\varepsilon}\right)T_{MG1} \quad (26)$$

$$T_{sh2} = \pm T_{MG2} = (T_{sh2} \pm T_{MG1}) = \pm\left(\frac{1}{\varepsilon}\right)T_{MG1} \quad (27)$$

$$\Omega_{sh2} = (1+\varepsilon)\Omega_{sh1} - \varepsilon\Omega_{MG1} \quad (28)$$

$$\Omega_{sh1} = \alpha\Omega_{ec} \quad (29)$$

In Equations (26) through (29), the "+" (plus and minus) sign presents the direction of a motor/generator applied torque such that a "+" (plus) sign denotes motoring mode torque that is applied in the direction of rotation of the rotor shaft, and a "−" (minus) sign denotes generating mode torque that is applied in reverse direction of rotation of the rotor shaft; $T_{MG1}$ represents the torque applied by the first motor/generator M/G1 assembly 70 and, depending on its sign, it is transmitted to the crankshaft pulley 19 as positive or negative amount of torque assist by which the engine-produced torque is reduced or increased; Tsh1 represents the torque applied to the rotor shaft 61 and is related to the torque applied by the first motor/generator M/G1 assembly 70 as given in Equation (26); and Tsh2 represents the torque transmitted to the sun gear 44 and rotor shaft 51 due to the rotor shaft 61 torque Tsh1 Meanwhile, $\Omega_{sh2}$ represents the rotational speed of the sun gear member 44 and rotor shaft 51; $\Omega_{sh1}$ represents the rotational speed of the rotor shaft 61 of the first motor/generator M/G1 assembly 70 and the assembly 10 pulley 12; $\Omega_{MG1}$ represents the rotational speed of the rotor assembly 60 of the first motor/generator M/G1 assembly 70 and ring gear member 41; and $\Omega_{ec}$ represents the engine 45 crankshaft pulley 19 rotational speed. The gear ratio ε is as defined earlier in Equation (5) and pulley drive ratio α is as defined in Equation (6).

Notwithstanding the constructional differences between this embodiments and the previous ones (first, second and third embodiments) described above, the function of the planetary gear train mechanism 40 is essentially the same. That is, the planetary gear train mechanism 40 primarily functions as a power transfer mechanism to receive a rotational speed and torque (that is mechanical power) from the rotor shaft 61 of the first motor/generator M/G1 assembly 70 and transmit it to the second motor/generator M/G2 assembly 80, wherein the torque is scaled down and rotational speed is scaled up in accordance with planetary gear train mechanics to maintain the mechanical power. Specifically, the planetary gear mechanism serves to transfer the mechanical power provided by the rotor shaft 61 of the first motor/generator M/G1 assembly 70 by increasing the rotational speed and decreasing the torque of the second motor/generator M/G2 assembly 80 in accordance with the mechanics of planetary gear as given in Equations (26) through (29). Accordingly, the size of the second motor/generator M/G2 assembly 80 required to match the mechanical power transferred from the rotor shaft 61 of the first motor/generator M/G1 assembly 70 is smaller than the size of the first motor/generator M/G1 assembly 70. Therefore, the second motor/generator M/G2 assembly 80 is constructed to have a smaller size than the first motor/generator M/G1 assembly 70, thereby significantly reducing the overall physical size and weight of the apparatus and ensuring improved power density and capability.

In essence, the technique disclosed in this embodiment of the present invention of increasing the rotational speed of the rotor 50 of the second motor/generator M/G1 assembly 80 using a planetary gear train mechanism effectively disposed axially at least partially within a cavity defined by the inner diameter of the rotor of the first motor/generator M/G1 assembly 70 makes it possible to significantly reduce the overall axial dimension of the power apparatus assembly 10, thus ensuring improved power density and capability essential for improving the fuel economy of a parallel hybrid vehicle.

This embodiment of the present invention provides two degrees of freedom to set the driving torque and rotational speed, and essentially mechanical power, of the first motor/generator M/G1 assembly 70. The preferred choice is to set the maximum torque and maximum rotational speed or maximum mechanical power of the first motor/generator M/G1 assembly 70 that yield maximum possible overall efficiency of the whole apparatus. For stable operation, it is essential that dynamic equilibrium must be maintained by satisfying Equations (26) through (29) at all instants in time.

When it is determined by a concrete procedure of the SCM 15 that the driving mode of the hybrid vehicle powertrain 100 in FIG. 7 requires both motoring mode torque to assist the engine 45 and generating mode electrical power to charge the onboard electric energy storage devices 14, one of the motor/generators is driven and controlled in motoring mode and the other is driven and controlled in generating mode. Therefore, this will be understood in the present invention that the ICCU1 13a must drive and control the first motor/generator M/G1 assembly 70 to provide torque $T_{MG1}$ applied in the direction of its rotor shaft 61 rotation so that it works as a motor and ICCU2 13b must drive and control the second motor/generator M/G2 assembly 80 to provide torque $T_{MG2}$ applied in the reverse direction of rotation of its rotor shaft 51 rotation so that it works as a generator to convert mechanical power to electrical power to charge the onboard electric energy storage devices 14. This must be accomplished under dynamic conditions such that the relationship between the torque $T_{MG1}$ applied by the first motor/generator M/G1 assembly 70 and torque $T_{MG2}$ applied by the second motor/generator M/G2 assembly 80 is in accordance with Equation (30).

$$T_{sh2} = -T_{MG2} = \left(\frac{1}{\varepsilon}\right) T_{MG1} \qquad (30)$$

When it is determined by a concrete procedure of the SCM 15 that the driving mode of the hybrid vehicle powertrain 100 in FIG. 7 requires motoring for torque assist and augmentation, such as during acceleration and hill climbing, one or both of the motor/generators may be driven and controlled in motoring mode. For the control option to drive and control both motor/generators in motoring mode, it will be understood that the ICCU1 13a must drive and control the first motor/generator M/G assembly 70 and ICCU2 13b must drive and control the second motor/generator M/G2 assembly 80 to produce torque $T_{MG1}$ and torque $T_{MG2}$ applied simultaneously in the directions of rotation of their associated rotor shaft 61 and shaft 51 so that they both work as motors. For stable operation of the hybrid powertrain 100, it is essential that dynamic equilibrium must be maintained by satisfying Equation (31) at all instants in time. In addition, depending on the torque assist and augmentation requirements, one of the two motor/generators may be capable of providing the torque needed.

$$T_{sh2} = T_{MG2} = \left(\frac{1}{\varepsilon}\right) T_{MG1} \qquad (31)$$

When it is determined by a concrete procedure of the SCM 15 that the driving mode of the hybrid vehicle powertrain 100 in FIG. 7 involves some regenerative braking, such as during deceleration or descending a hill, the first motor/generator M/G1 assembly 70 and the second motor/generator M/G2 assembly 80 may both be driven and controlled simultaneously to generate electrical power for charging the onboard electrical energy storage devices 14. This is accomplished by having the ICCU1 13a drive and control the first motor/generator M/G1 70 assembly to produce torque $T_{MG1}$ and ICCU2 13b drive and control the second motor/generator M/G2 assembly 80 to produce torque $T_{MG2}$ that are both simultaneously applied in the reverse directions of rotation of their associated rotor shafts 61 and 51 so that they both work as generators in accordance with Equation (32).

$$T_{sh2} = -T_{MG2} = -\left(\frac{1}{\varepsilon}\right) T_{MG1} \qquad (32)$$

Fifth Embodiment

Figure 5:
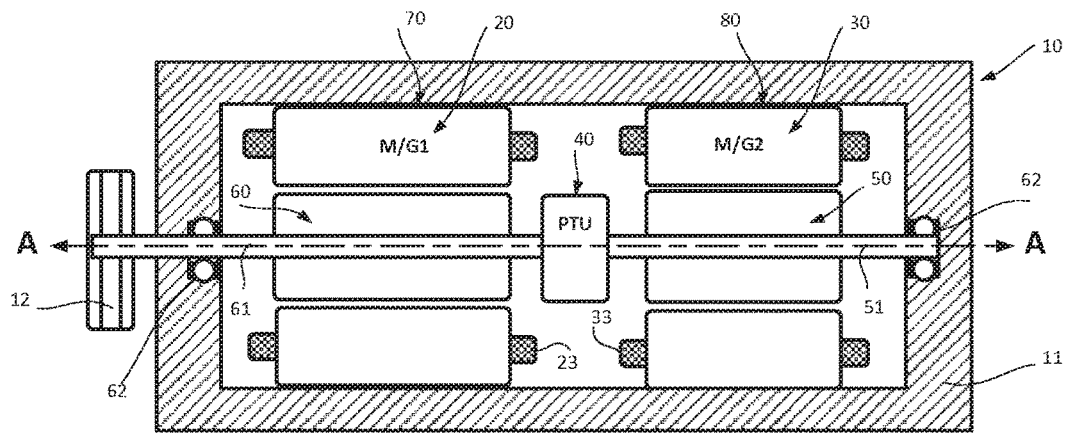
FIG. 5 is a cross-sectional view of dual-structured power output apparatus according to a fifth embodiment.

A dual-structured power output apparatus in a fifth embodiment of the present invention is discussed below. FIG. 5 illustrates a cross section of the fifth embodiment of a dual-structured power output apparatus assembly 10 of the present invention. In this embodiment, the assembly 10 comprises a first motor/generator M/G1 assembly 70 and a second motor/generator M/G2 assembly 80 in tandem. The difference between this embodiment and the other embodiments of the present invention is that the rotors of the two motor/generators are rotatable at the same speed rather than relative to each other at different speeds. The construction of this particular embodiment may be understood to include a power transmission unit disposed between the two motor/generators and mechanically linking the rotors 60 and 50, wherein it is configured in a manner such that the rotors are rotatable at the same speed. This means that when one of the rotor shafts rotates due to torque applied to it, the other shaft will follow and rotate together at the same speed and torque. The rotor shaft 61 and shaft 51 are supported by bearings on at least two ends with respect to the housing 11. On one end of the rotor shaft 61 is attached the assembly 10 pulley 12 having a plurality of grooves as shown in FIG. 7, or sprocket having a plurality of teeth, for mechanical coupling and torque transfer to and from the engine 45 crankshaft pulley 19 via a high tension serpentine belt 18, flexible chain or other suitable means. Because of the construction, wherein the rotor assembly 60 and rotor assembly 50 of the assembly 10 rotate together at the same speed, the resultant sum of the torque $T_{MG1}$ applied to the rotor shaft 61 due to the first motor/generator M/G1 assembly 70 and torque $T_{MG2}$ applied to the rotor shaft 51 due to the second motor/generator M/G2 assembly 80 is effectively applied at the assembly pulley 12 and transmitted to the engine 45 crankshaft pulley 19 as the amount of torque assist by which the torque produced by the engine 45 is reduced. The rotational speed and torque relationships for this embodiment of the dual-structured power output apparatus are as given in Equation (33) and (34):

$$T_{sh1} = T_{sh2} = \pm T_{MG1} \pm T_{MG2} \qquad (33)$$

$$\Omega_{sh1} = \Omega_{sh2} = \alpha \Omega_{ec} \qquad (34)$$

In Equations (33) and (34), the "±" (plus and minus) sign presents the direction of a motor/generator applied torque such that a "+" (plus) sign denotes motoring mode torque that is applied in the direction of rotation of the rotor shaft, and a "−" (minus) sign denotes generating mode torque that is applied in reverse direction of rotation of the rotor shaft; $T_{MG1}$ represents the torque applied by the first motor/generator M/G1 assembly 70 and, depending on its sign, it is transmitted to the crankshaft pulley 19 as positive or negative amount of torque assist by which the engine-produced torque is reduced or increased; $T_{MG2}$ represents the torque applied by the second motor/generator M/G2 assembly 80 and, depending on its sign, it is transmitted to the crankshaft pulley 19 as positive or negative amount of torque assist by which the engine-produced torque is reduced or increased; Tsh1 is equal to Tsh2 and they represent the resultant sum of the torque $T_{MG1}$ applied to the rotor shaft 61 by the first motor/generator M/G1 assembly 70 and torque $T_{MG2}$ applied to the rotor shaft 51 by the second motor/generator M/G2 assembly 80. Meanwhile, Ωsh1 is equal to Ωsh2 and they represent the rotational speed of the rotor shaft 61, rotor shaft 51 and the assembly 10 pulley 12.

When it is determined by a concrete procedure of the SCM 15 that the driving mode of the hybrid vehicle powertrain 100 in FIG. 7 requires both motoring mode torque to assist the engine 45 and generating mode electrical power to charge the onboard electric energy storage devices 14, one of the motor/generators is driven and controlled in motoring mode and the other is driven and controlled in generating mode. In this mode, it will be understood that the ICCU1 13*a* must drive and control the first motor/generator M/G1 assembly 70 to produce torque $T_{MG1}$ applied in the direction of the rotor shaft 61 rotation so that it works as a motor and ICCU2 13*b* must drive and control the second motor/generator M/G2 assembly 80 to produce torque $T_{MG2}$ applied in the reverse direction of the rotor shaft 51 rotation so that it works as a generator to convert mechanical power to electrical power to charge the onboard electric energy storage devices 14. The total torque applied to the rotor shaft 61 and rotor shaft 51 is the resultant sum of the torque $T_{MG1}$ applied by the first motor/generator M/G1 assembly 70 and torque $T_{MG2}$ applied by the second motor/generator M/G2 assembly 80 as given in Equation (35). Unlike the embodiments having a planetary gear train mechanism, the requirements for dynamic equilibrium that the two motor/generators have to satisfy at all instants in time is not required for this embodiment.

$$T_{sh1}=T_{sh2}=T_{MG1}-T_{MG2} \tag{35}$$

When it is determined by a concrete procedure of the SCM 15 that the driving mode of the hybrid vehicle powertrain 100 in FIG. 7 requires motoring for torque assist and augmentation, such as during acceleration and hill climbing, one or both of the motor/generators may be driven and controlled in motoring mode. For the control option to drive both motor/generators in motoring mode, the ICCU1 13*a* must drive and control the first motor/generator M/G assembly 70 and ICCU2 13*b* must drive and control the second motor/generator M/G2 assembly 80 to produce torque $T_{MG1}$ and torque $T_{MG2}$ applied simultaneously in the directions of rotation of the rotor shaft 61 and shaft 51 so that they both work as motors as expressed in Equation (36). The requirements for dynamic equilibrium that the two motor/generators have to satisfy at all instants in time for the embodiments having a planetary gear train mechanism 40 is not required. Depending on the acceleration and augmentation requirements, one of the two motor/generators may be capable of providing the required motoring torque. The resultant torque is the amount of torque assist transmitted to the crankshaft pulley 19 by which the engine-produced torque is reduced.

$$T_{sh1}=T_{sh2}=T_{MG1}+T_{MG2} \tag{36}$$

When it is determined by a concrete procedure of the SCM 15 that the driving mode of the hybrid vehicle powertrain 100 in FIG. 7 involves some regenerative braking, such as during deceleration or descending a hill, the first motor/generator M/G1 assembly 70 and the second motor/generator M/G2 assembly 80 may both be driven and controlled simultaneously to generate electrical power for charging the onboard electric energy storage devices 14. This is accomplished by having the ICCU1 13*a* drive and control the first motor/generator M/G1 70 assembly to produce torque $T_{MG1}$ and ICCU2 13*b* drive and control the second motor/generator M/G2 assembly 80 to produce torque $T_{MG2}$ that are both simultaneously applied in the reverse directions of rotation of the rotor shaft 61 and shaft 51 so that they both work as generators in accordance with Equation (37). The resultant torque is the amount of torque assist transmitted to the crankshaft pulley 19 by which the engine-produced torque is increased. As mentioned above, the requirements for dynamic equilibrium that the two motor/generators have to satisfy at all instants in time for the embodiments having a planetary gear train mechanism 40 is not required.

$$T_{sh1}=T_{sh2}=(T_{MG1}+T_{MG2}) \tag{37}$$

The present invention may further be directed to a control system with the power output apparatus mounted thereon. FIG. 6 illustrates the electric drive and power system assembly 1 for controlling the dual-structured power output apparatus assembly 10. This will be understood in the present invention that controlling the dual-structured power output apparatus assembly 10 involves controlling the operating modes of the two motor/generators of the apparatus according to embodiments of the invention. The electric drive and power system assembly 1 of FIG. 6 will be described with reference to the elements of the dual-structured power output apparatus assembly 10 of the embodiments in FIGS. 1 through 5.

The system includes the dual-structured power output apparatus assembly 10 that comprises two motor/generators, wherein both can be driven and controlled to operate in one of these three operational modes that are referred to herein as motoring-motoring, motoring-generating and generating-generating. Motoring-motoring denotes that both motor/generators are operating in motoring modes, motoring-generating denotes that one of the motor/generators is operating in motoring mode and the other in generating mode, and generating-generating denotes that both motor/generators are operating in generating modes.

The system assembly 1 also includes: (1) two bidirectional controller units, ICCU1 13*a* and ICCU2 13*b*; (2) a supervisory control module 15 that synthesizes vehicle and motor/generator sensor input data 17 into commands for executing the overall power management, power control and protection functions of the assembly 1 that ensures the motor/generators of the dual-structured power output apparatus assembly 10 are operating properly in one of the three main operational modes listed above in accordance with the operating conditions of the system. The system assembly 1 vehicle sensor inputs 17*a* include accelerator pedal, brake pedal and clutch pedal inputs, state-of-charge input for the onboard electric energy storage devices 14, fuel consumption input, and vehicle speed and other sensor inputs. Meanwhile, motor/generator sensor inputs 17*b* include torque, speed, voltage, current as well as ambient and winding temperature inputs.

The control system assembly 1 may include at least a microcontroller to perform all the necessary signal processing and control algorithm computations, a control software to generate output control signals to control power supplied to and generated by both motor/generators of the dual-structured power output apparatus, input/output ports connected to the dual-structured power output apparatus assembly 10, bidirectional controller units and any device to interacts with the system assembly 1.

The two bidirectional controller units, ICCU1 13*a* and ICCU2 13*b*, may include multiphase power converters to drive and control each of the multiphase motor/generator windings in one of the operational modes as a motor or generator, and bidirectional dc-to-dc converter for power conversion of the power generated from the motor/generators to charge the onboard electric energy storage devices 14 and support the operation of onboard auxiliary devices and loads 13*c*.

When it is determined by a concrete procedure of the supervisory control module 15 that the dual-structured power output apparatus assembly 10 is required to function in one of the operational modes, the ICCU1 13a and ICCU2 13b precisely drives and controls both motor/generators independently based on a closed-loop torque control algorithm. The torque control algorithm controls the output torque by controlling each of the multiphase motor/generator phase currents directly. The multiphase currents are controlled by regulating the phase voltages based on a pulse-width modulation (PWM) technique that switches on and off the input voltage of the power converters at a high frequency.

For motoring mode to provide torque- and power-assist, the torque control commands from the supervisory control module 15 are passed to the controller units, ICCU1 13a and ICCU2 13b, as positive torque command values so that the associated motor/generators are driven and controlled to carry out the motoring mode operations by applying torques in the directions of rotation of the associated rotor shafts, thereby provide mechanical torque and power.

For generating mode, the torque control commands from the supervisory control module 15 are passed to the controller units, ICCU1 13a and ICCU2 13b, as negative torque command values so that the associated motor/generators are driven and controlled to carry out the regenerative mode operations by applying torques in the reverse directions of rotation of the associated rotor shafts, thereby generate electrical power to charge the electric energy storage devices 14.

The system assembly 1 also includes a fault detection and protection means such that the system 1 is protected from fault conditions that includes short-circuit, over-voltage, over-current, over-speed, and over-temperature by reducing or limiting power consumed and produced as well as shutting down the currents supplied to and produced by the motor/generators of the dual-structured power output apparatus assembly 10.

Also, disclosed in the present invention is a method for controlling the dual-structured power output apparatus assembly 10 according to any of the embodiments of the present invention. FIGS. 8 through 11 illustrate a method of controlling the power flow in a hybrid vehicle powertrain that includes the dual-structured power output apparatus assembly 10, controller units ICCU1 13a and ICCU2 13b, onboard electric energy storage devices 14 mounted thereon, and an engine. The hybrid vehicle powertrain 100 takes advantage of the characteristics of the electric drive and power system assembly 1 in accordance with the driving conditions to ensure improvement in fuel efficiency.

In the construction of the hybrid vehicle 100 illustrated in FIG. 7, the electric drive and power system 1 is linked to a conventional engine 45 via a serpentine belt 18 or special belt that mechanically couples the pulley 12 of the assembly 10 to the crankshaft pulley 19 of the engine 45 to form a parallel-structured hybrid powertrain. The parallel-structured hybrid vehicle powertrain thus constructed enables the output power of the dual-structured power output apparatus assembly 10 to be transmitted to the engine, thereby providing part of the mechanical power transmitted to the drivetrain.

FIGS. 8 through 12 illustrate the method of controlling the power flow of an electric drive and power output apparatus according to any of the embodiments of the present invention. The figures also include arrows with thicknesses to illustrate relative proportion of the mechanical power and electrical power consumed and generated in the hybrid vehicle 100 during various driving conditions or states. The method of controlling the power flow is described below for the following states of the hybrid vehicle.

State I—Engine Only Mode

Figure 8:
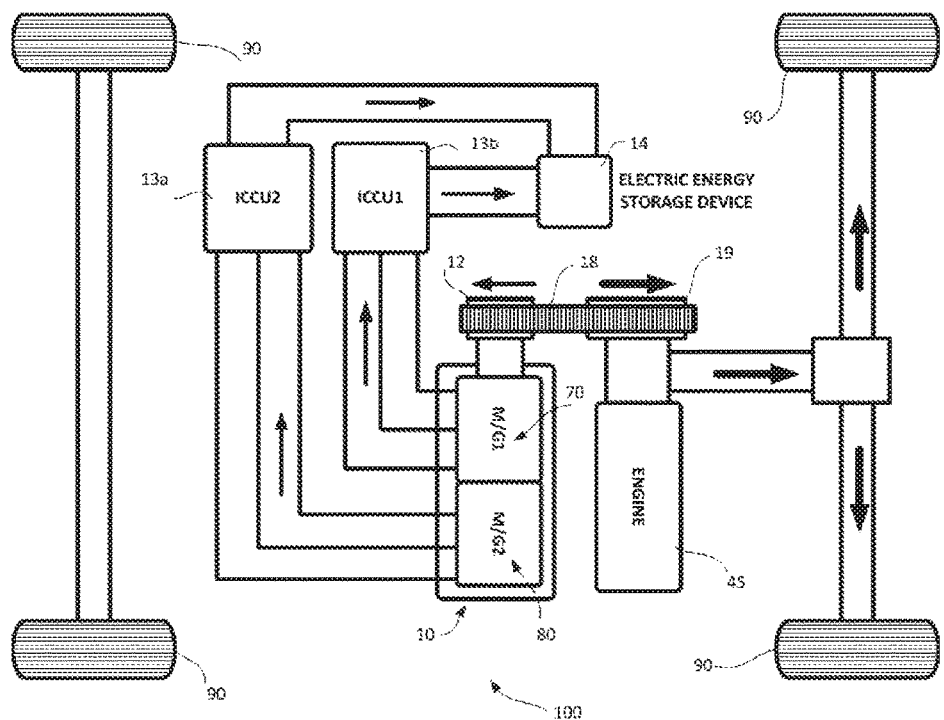
FIGS. 8 through 12 illustrate a method of controlling a dual-structured electric drive and power system according to any of the embodiments of the present invention for various driving conditions of a hybrid powertrain system.

FIG. 8 illustrates the engine only mode state of the power flow of the hybrid vehicle 100, as determined by the supervisory control module 15, in which the engine provides all the mechanical power required to drive the vehicle as illustrated by the thicker arrows. The electric drive and power system assembly 1 operates in generator mode to provide relatively a smaller amount of electrical power that is used to charge the onboard electric energy storage devices 14.

This state of the hybrid vehicle 100 is applicable for very low speed when the clutch pedal 16 is depressed, when the vehicle is in neutral, or when the state-of-charge (SOC) of the electric energy storage devices 14 is low that attempting to used them could cause irreversible damage. In this state of the hybrid vehicle 100, the vehicle power demand is handled directly by the engine and the dual-structured power output apparatus assembly 10 provides no electromagnetic torque.

State II—Startup, Low Speed and Acceleration Modes

Figure 9:
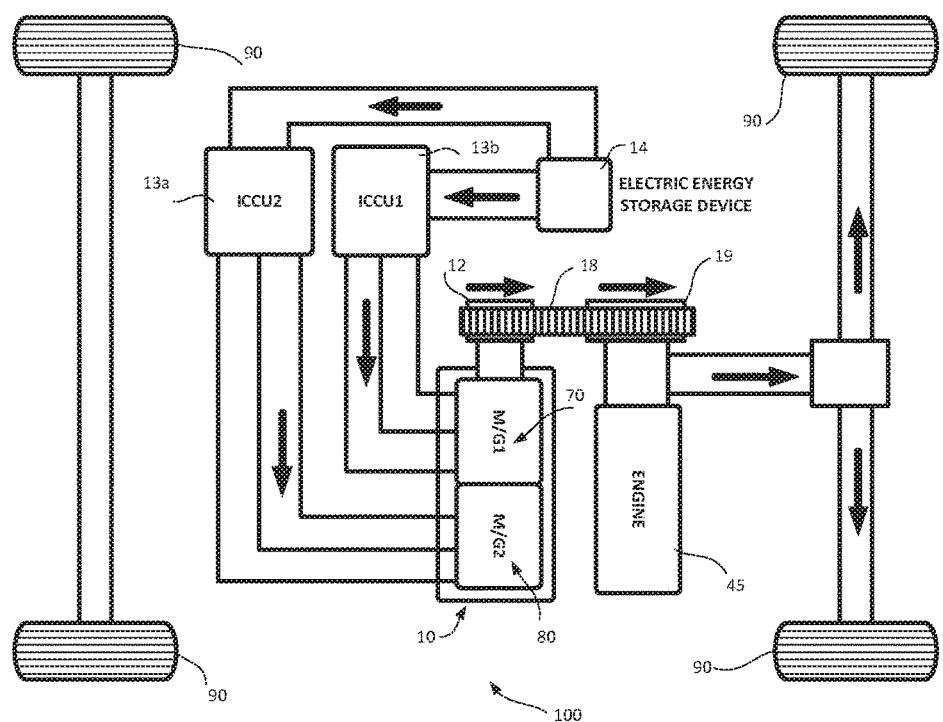

FIG. 9 illustrates the state of the power flow of the hybrid vehicle 100 during startup, low speed and acceleration modes. In this state of the hybrid vehicle 100 operation with the accelerator pedal 16 depressed, both the engine 45 and electric drive and power system assembly 1 are providing mechanical power to the drivetrain and wheels 90. The first motor/generator M/G1 assembly 70 and second motor/generator M/G2 assembly 80 are both driven and controlled in motoring modes by the ICCU1 13a and ICCU2 13b to provide mechanical torque and power to start and assist the engine 45 during acceleration and low speed using electrical power from the onboard electric energy storage devices 14. For this state of the hybrid vehicle 100 operation, the bulk of the electric power is drawn from the electric energy storage devices 14 and efficiently converted to mechanical power that is transmitted through the serpentine belt or special belt 18 to the crankshaft pulley 19 and drivetrain, as illustrated by the thicker arrows.

If more traction power is needed for additional acceleration demand, then both ICCU1 13a and ICCU2 13b will drive and control the first motor/generator M/G1 assembly 70 and the second motor/generator M/G2 assembly 80 to deliver 150 percent transient overload torque and power for up to 60 seconds. During the duration of the transient overload operation, the winding temperatures of the two motor/generators of the dual-structured power output apparatus assembly 10 are continuously monitored to ensure that they do not exceed the maximum allowable temperature limits.

State III—Cruising Speed Mode

Figure 10:
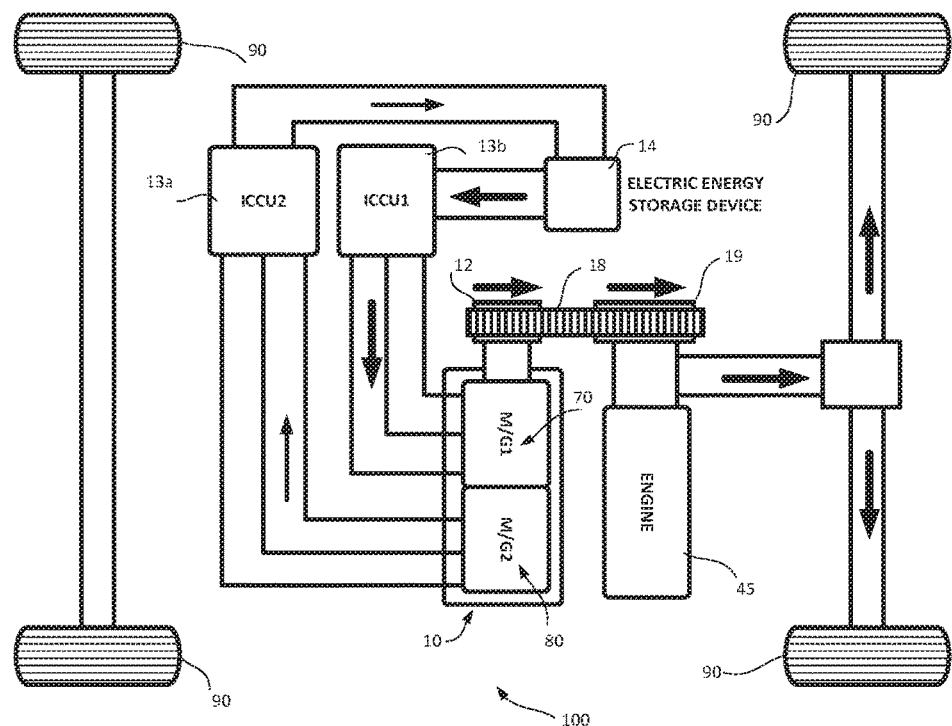

FIG. 10 illustrates the state of the power flow of the hybrid vehicle 100 in cruising mode at moderate speed. In the moderate speed range of the cruising speed mode of the hybrid vehicle 100 with the accelerator pedal 16 depressed, the first motor/generator M/G1 assembly 70 is driven by the ICCU1 13a to continue providing mechanical torque- and power-assist to the engine 45 and second motor/generator M/G2 assembly 80 is driven by the ICCU2 13b to generate a relatively smaller amount of electrical power that is used to charge the onboard electric energy storage devices 14. The mechanical power transmitted to the engine during this state from the first motor/generator M/G1 assembly 70 is larger than the electrical power generated by the second motor/generator M/G2 assembly 80, as illustrated by the thicker and thinner arrows of FIG. 10.

Figure 11:
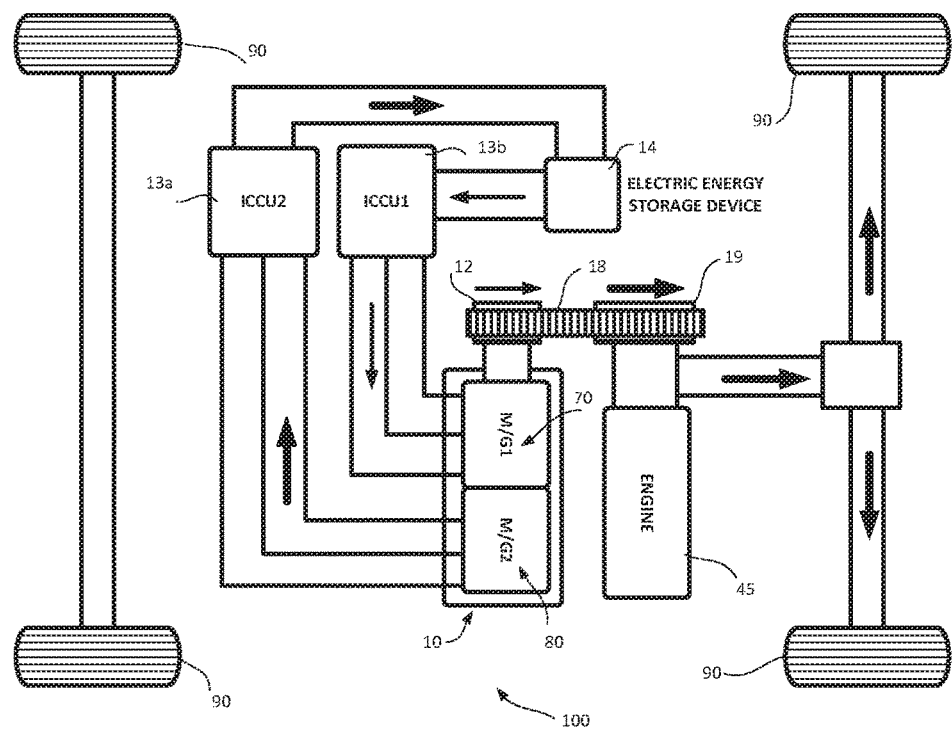

FIG. 11 also illustrates the state of the power flow of the hybrid vehicle 100 in cruising mode at high speed. In the high speed range of the cruising speed mode of the hybrid vehicle 100 with the accelerator pedal farther depressed, the mechanical torque and power transmitted from the first motor/generator M/G1 assembly 70 to the engine 45 is further reduced accordingly, and the electrical power generated by the second motor/generator for charging the onboard electric energy storage devices 14 is increased accordingly. That is, as the speed increases to the high speed range, less mechanical torque and power are allocated by the supervisory control module 15 that are transmitted to the drivetrain and wheels 90 of the hybrid vehicle 100, and more generated electrical power is allocated for charging the onboard electric energy storage devices 14. The relatively smaller mechanical power allocated is illustrated with the thinner arrows and the relatively larger electrical power allocated is illustrated with the thicker arrows.

State IV—Deceleration and Braking Modes

Figure 12:
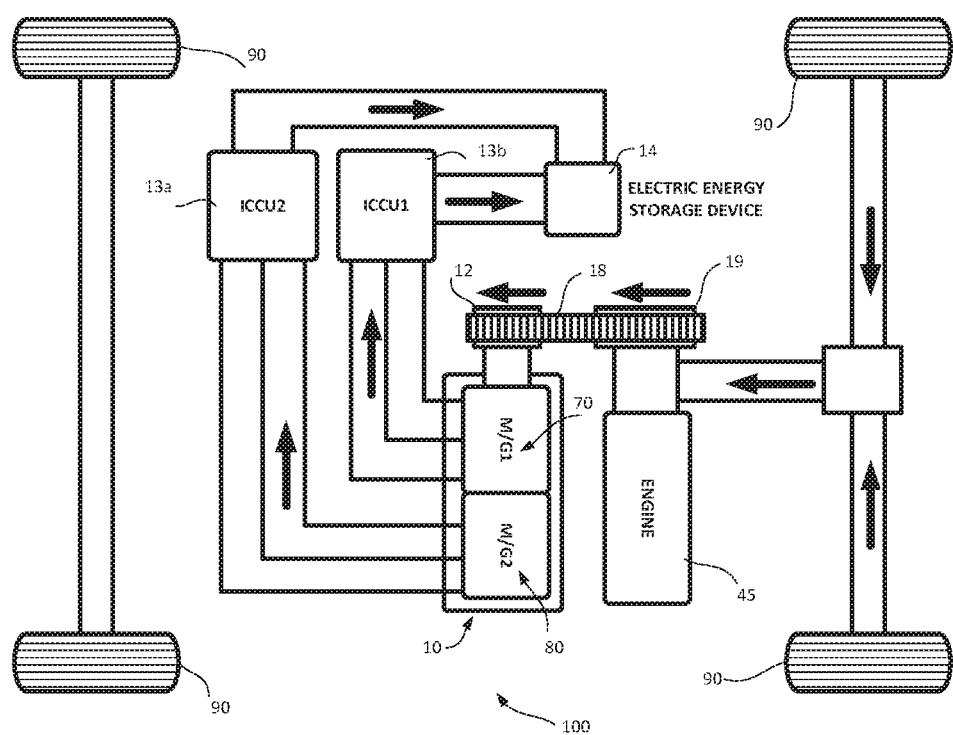

FIG. 12 illustrates the state of the power flow of the hybrid vehicle 100 in deceleration and braking modes. The hybrid vehicle 100 goes into this state only when the brake pedal 16 is depressed. During deceleration and braking modes, both the first motor/generator M/G1 assembly 70 and second motor/generator M/G2 assembly 80 are driven and controlled to operate in generating modes to apply regenerative brake, thereby extract mechanical energy from the drivetrain that is converted to electrical power to charge the onboard electric energy storage devices 14. Both motor/generators of the dual-structured power output apparatus are driven and controlled to generate the maximum power possible at the operating speed, as illustrated by with the thicker arrows in FIG. 12.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed herein as the best mode contemplated for carrying out this invention, but that the invention will include all embodiments falling within the scope of the claims.

The invention claimed is:

1. An apparatus, comprising:
an accessory to selectively transfer power to a crankshaft of a mechanical power source of a motor vehicle via a belt, to selectively transfer power from the crankshaft via the belt, the accessory including:
a housing;
an elongated structure partially enclosed by the housing, the elongated structure having a first end region including a first rotor shaft, a second end region including a second rotor shaft, and a third region located between the end regions, the third region including a power transfer unit linking an end of the first rotor shaft to an end of the second rotor shaft;
a first motor/generator assembly enclosed within the housing and formed around a portion of the first end region of the elongated structure, the first motor/generator assembly including a first rotor assembly attached to the first rotor shaft and disposed at least partially within a first stator assembly; and
a second motor/generator assembly enclosed within the housing and formed around a portion of the second end region of the elongated structure, the second motor/generator assembly including a second rotor assembly attached to the second rotor shaft and disposed at least partially within a second stator assembly;
wherein the power transfer unit is arranged to apply a rotational torque to one of the end of the first rotor shaft or the end of the second rotor shaft based on a rotational torque of the other of said ends; and
wherein the housing includes an opening, wherein a portion of one of the rotor shafts protrudes from the opening, and the apparatus further comprises:
a pulley to couple to the belt, the pulley on said protruding portion of the one of the rotor shafts.

2. The apparatus of claim 1, further comprising:
first bearings mounted on a portion of the housing that defines the opening, the first bearings supporting one of the rotor shafts.

3. The apparatus of claim 2, further comprising:
second bearings mounted on a different portion of the housing, the second bearings supporting the other one of the rotor shafts.

4. The apparatus of claim 3, wherein the housing includes an interior surface defining a single cavity and the second bearings are mounted on said interior surface.

5. The apparatus of claim 3, wherein the housing includes an interior surface and at least one interior wall protruding from the interior surface to define a plurality of cavities, and the apparatus further comprises third bearings mounted on a top of the interior wall.

6. The apparatus of claim 5, wherein the third bearings support the first rotor shaft.

7. The apparatus of claim 5, wherein the third bearings support the second rotor shaft.

8. The apparatus of claim 1, wherein the housing includes an interior surface and at least one interior wall protruding from the interior surface to define a plurality of cavities.

9. The apparatus of claim 8, wherein the first motor/generator assembly is disposed within a first cavity of the plurality of cavities and the second motor/generator assembly is disposed within a second different cavity of the plurality of cavities.

10. The apparatus of claim 9, wherein the power transfer unit is disposed within the second cavity.

11. The apparatus of claim 9, wherein the power transfer unit is disposed within the first cavity.

12. The apparatus of claim 9, wherein the first rotor assembly defines a cavity and the power transfer unit is disposed within the cavity defined by the first rotor assembly.

13. The apparatus of claim 1, wherein stator coils protruding from one of the stator assemblies form a radial inner space of a respective one of the motor/generator assemblies, and wherein the power transfer unit is disposed at least partially within the radial inner space.

14. The apparatus of claim 1, wherein the power transfer unit comprises a gear train comprising a first gear coupled to the end of the first rotor shaft and a second gear coupled to the end of the second rotor shaft.

15. The apparatus of claim 14, wherein the first gear is non-rotatable with respect to the housing and the second gear is rotatable with respect to the housing.

16. The apparatus of claim 14, wherein the first and second gears are rotatable with respect to the housing.

17. The apparatus of claim 1, wherein a gear train of the power transfer unit is structured to match a speed of rotation of one of the rotor shafts relative to the housing to a speed of rotation of the other one of the rotor shafts relative to the housing.

18. The apparatus of claim 1, wherein
a surface of the pulley includes a plurality of grooves to mate with a plurality of teeth of the belt.

19. The apparatus of claim 1, further comprising:
an interface to receive an external control to identify whether to jointly charge a common energy storage by the motor/generator assemblies, to jointly discharge the common energy storage to assist the mechanical power source, or to charge and discharge independently; and
an interface to couple to an external wire coupled to the common energy storage.

20. A motor vehicle, comprising:
a mechanical power source having a crankshaft; and
an accessory coupled to the mechanical power source by a belt, the accessory to selectively transfer power to the crankshaft of the mechanical power source via the belt, to selectively transfer power from the crankshaft via the belt, the accessory including:
a housing;
an elongated structure partially enclosed by the housing, the elongated structure having a first end region including a first rotor shaft, a second end region including a second rotor shaft, and a third region located between the end regions, the third region including a power transfer unit linking an end of the first rotor shaft to an end of the second rotor shaft;
a first motor/generator assembly enclosed within the housing and formed around a portion of the first end region of the elongated structure, the first motor/generator assembly including a first rotor assembly attached to the first rotor shaft and disposed at least partially within a first stator assembly; and
a second motor/generator assembly enclosed within the housing and formed around a portion of the second end region of the elongated structure, the second motor/generator assembly including a second rotor assembly attached to the second rotor shaft and disposed at least partially within a second stator assembly;
wherein the power transfer unit is arranged to apply a rotational torque to one of the end of the first rotor shaft or the end of the second rotor shaft based on a rotational torque of the other of said ends; and
wherein the housing includes an opening, wherein a portion of one of the rotor shafts protrudes from the opening, and the apparatus further comprises:
a pulley to couple to the belt, the pulley on said protruding portion of the one of the rotor shafts.

21. The motor vehicle of claim 20, wherein the belt comprises a serpentine belt.

* * * * *